United States Patent
Hirao et al.

(10) Patent No.: US 8,477,437 B2
(45) Date of Patent: Jul. 2, 2013

(54) LENS UNIT, IMAGE CAPTURING LENS, IMAGE CAPTURING DEVICE AND PORTABLE TERMINAL

(75) Inventors: Yusuke Hirao, Sakai (JP); Keiji Matsusaka, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 249 days.

(21) Appl. No.: 12/866,537

(22) PCT Filed: Feb. 10, 2009

(86) PCT No.: PCT/JP2009/052201
§ 371 (c)(1),
(2), (4) Date: Aug. 6, 2010

(87) PCT Pub. No.: WO2009/101928
PCT Pub. Date: Aug. 20, 2009

(65) Prior Publication Data
US 2011/0013070 A1    Jan. 20, 2011

(30) Foreign Application Priority Data
Feb. 12, 2008  (JP) ................................. 2008-030886

(51) Int. Cl.
*G02B 9/04*    (2006.01)
*G02B 13/18*   (2006.01)
*G02B 3/02*    (2006.01)

(52) U.S. Cl.
USPC .......................................... 359/793; 359/717

(58) Field of Classification Search
USPC ................. 359/796, 797, 793, 795, 715, 771, 359/772
See application file for complete search history.

(56) References Cited

U.S. PATENT DOCUMENTS

| | | | |
|---|---|---|---|
| 5,815,301 A | 9/1998 | Naika et al. | 359/205 |
| 5,943,153 A | 8/1999 | Naika et al. | 359/210 |
| 7,773,317 B2* | 8/2010 | Duparre | 359/793 |
| 2003/0086184 A1* | 5/2003 | Abe et al. | 359/796 |
| 2005/0237899 A1 | 10/2005 | Ikenaka et al. | 369/112.05 |
| 2006/0044450 A1 | 3/2006 | Wolterink et al. | 348/340 |
| 2006/0262416 A1 | 11/2006 | Lee et al. | 359/645 |
| 2007/0211324 A1 | 9/2007 | Sakai et al. | 359/213 |
| 2007/0275505 A1 | 11/2007 | Wolterink et al. | 438/118 |

FOREIGN PATENT DOCUMENTS

| | | |
|---|---|---|
| CN | 1682377 A | 10/2005 |
| CN | 1866054 A | 11/2006 |
| CN | 101278211 A | 10/2008 |
| JP | 08-292391 A | 11/1996 |
| JP | 2003-177295 A | 6/2003 |
| JP | 2005-310276 A | 11/2005 |

(Continued)

*Primary Examiner* — Alicia M Harrington
(74) *Attorney, Agent, or Firm* — Cozen O'Connor

(57) ABSTRACT

A lens unit LU in which a lens portion L is formed at least on either a light-receiving surface or a light-emitting surface of a lens holding plate P, wherein a difference in coefficients of linear expansion of the lens holding plate P and the lens portion L is used to suppress mis-focusing by causing changes in a paraxial image point position of the entire lens system due to changes in the surface shape of the lens portion L which accompany temperature changes, and changes in the paraxial image point position of the entire lens system due to changes in the refraction index to cancel each other out. Furthermore, deterioration of performance of the entire lens system caused by rising temperature is suppressed by satisfying a predetermined conditional expression.

14 Claims, 16 Drawing Sheets

FOREIGN PATENT DOCUMENTS

| | | |
|---|---|---|
| JP | 2005-539276 A | 12/2005 |
| JP | 2006-323365 A | 11/2006 |
| JP | 3926380 B1 | 3/2007 |
| JP | 3946245 B1 | 4/2007 |
| JP | 2007-126636 A | 5/2007 |
| JP | 3976781 B1 | 6/2007 |
| JP | 2007-248977 A | 9/2007 |
| KR | 10-2006-0119020 A | 11/2006 |
| KR | 10-2007-0089889 A | 9/2007 |
| KR | 10-2007-0096020 A | 10/2007 |
| WO | WO 2004/027880 A2 | 4/2004 |
| WO | WO 2007/043492 A1 | 4/2007 |
| WO | WO 2009/101928 A1 | 8/2009 |

\* cited by examiner

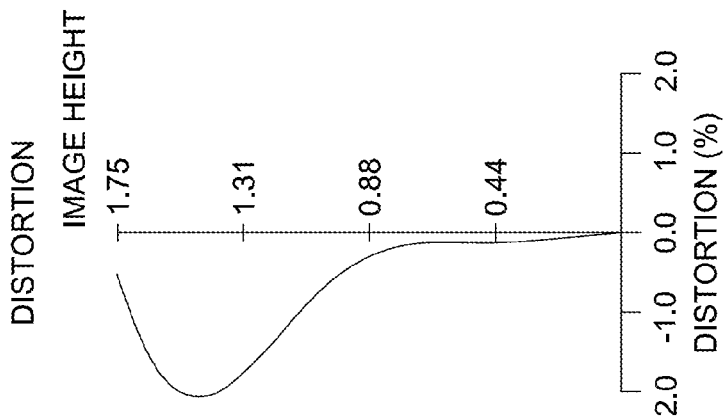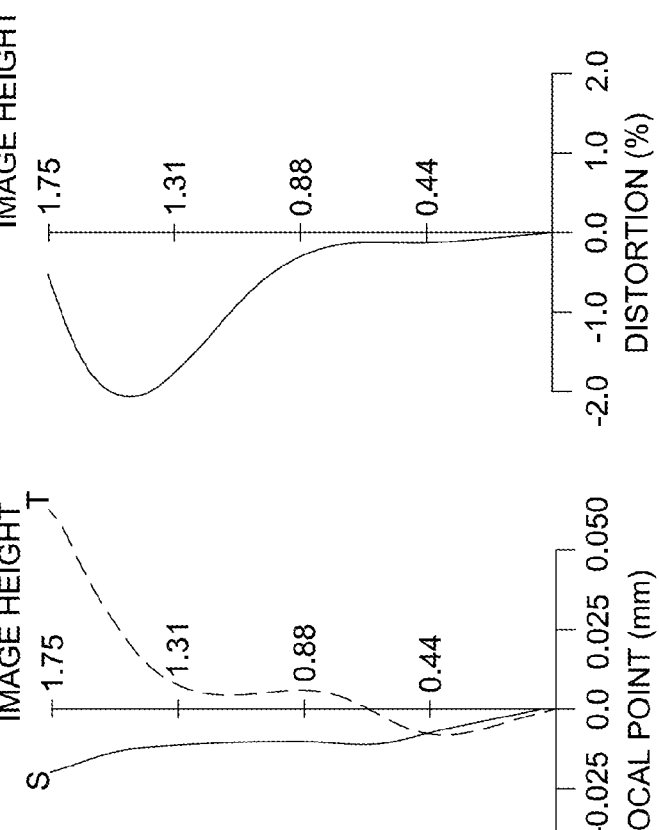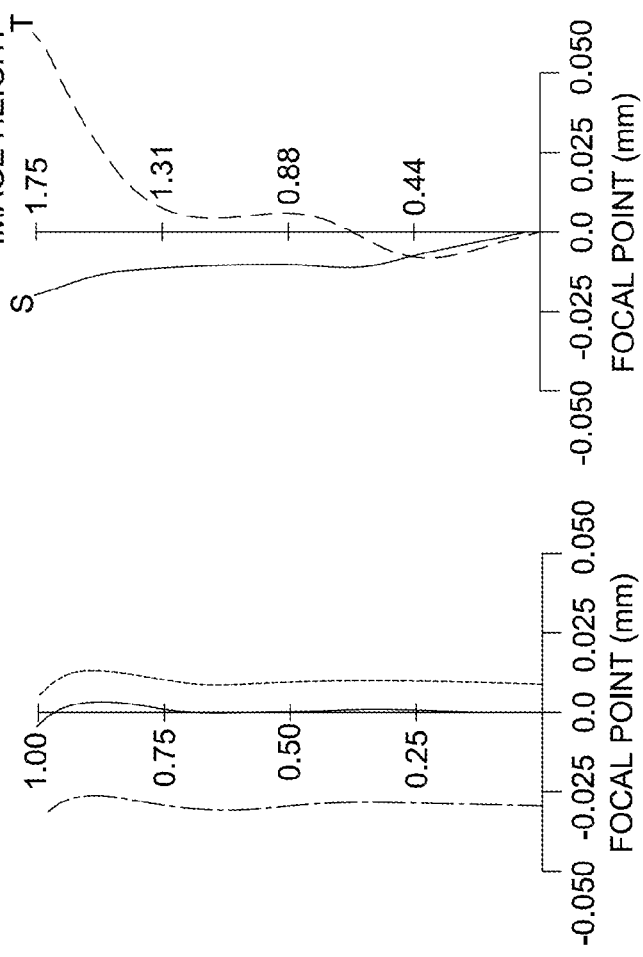

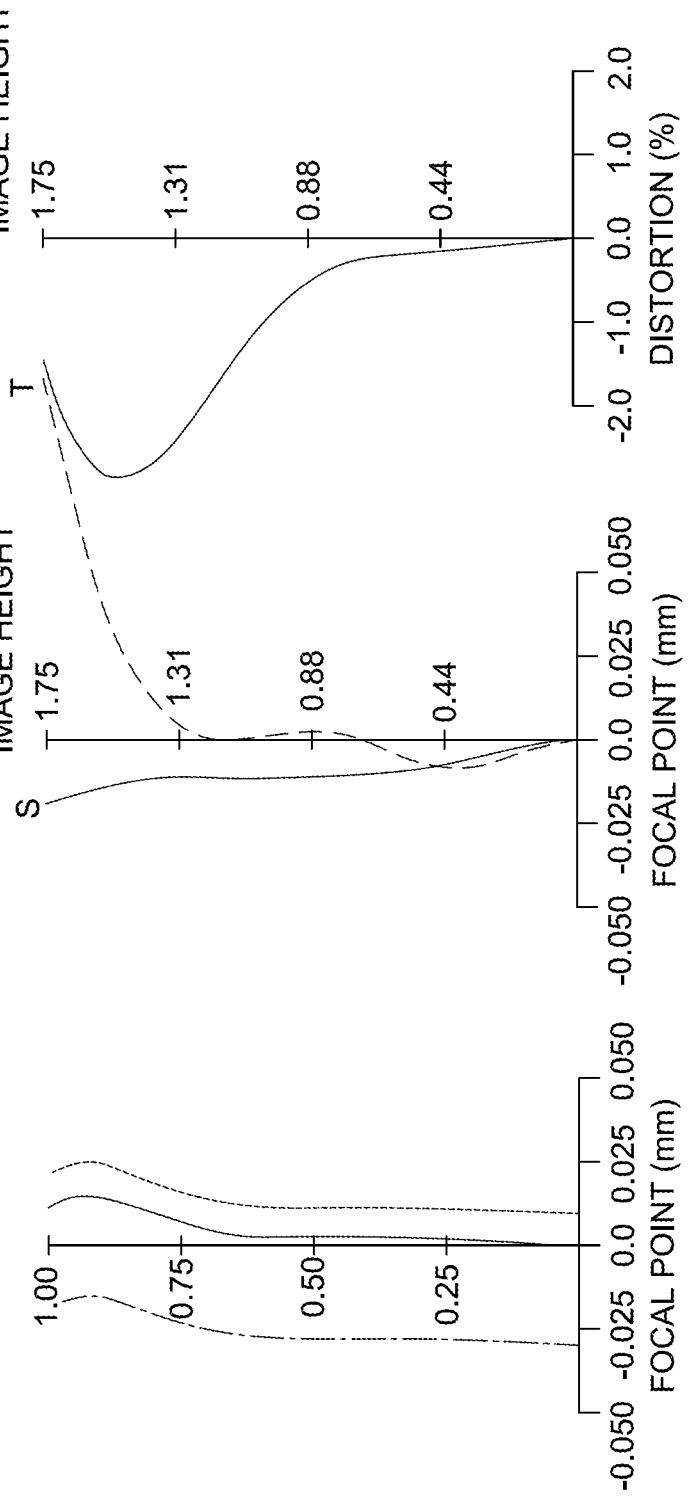
FIG. 11A SPHERICAL ABERRATION
FIG. 11B ASTIGMATISM
FIG. 11C DISTORTION

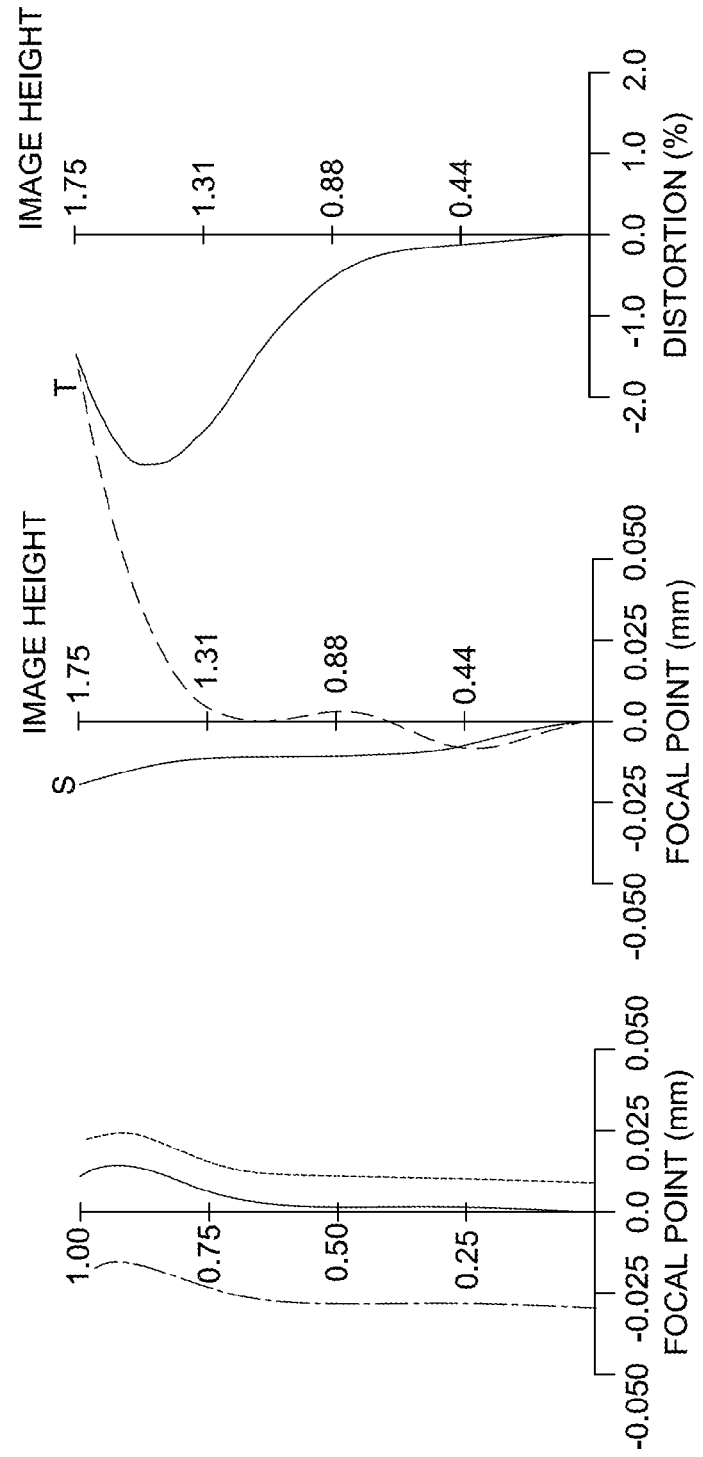

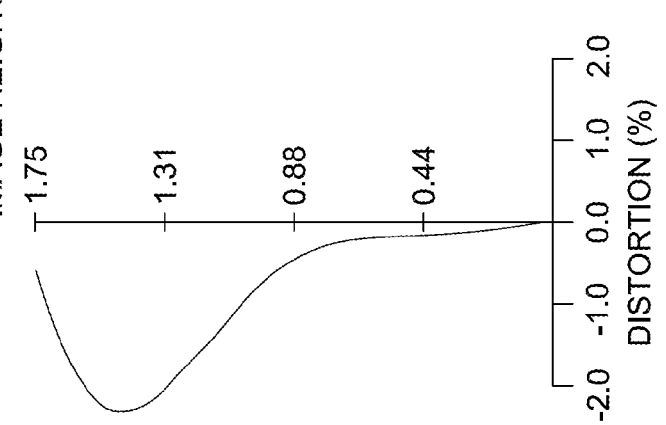
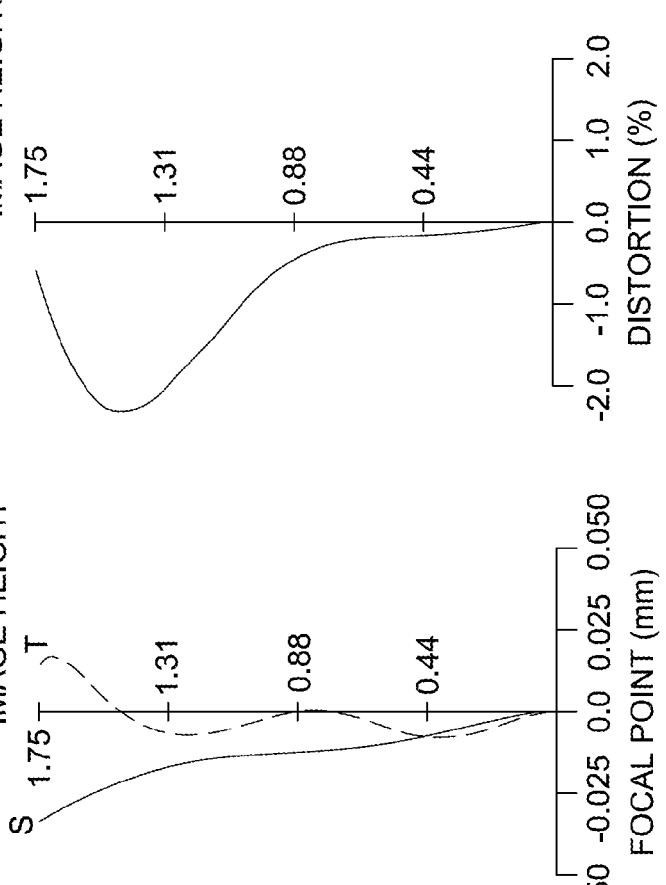
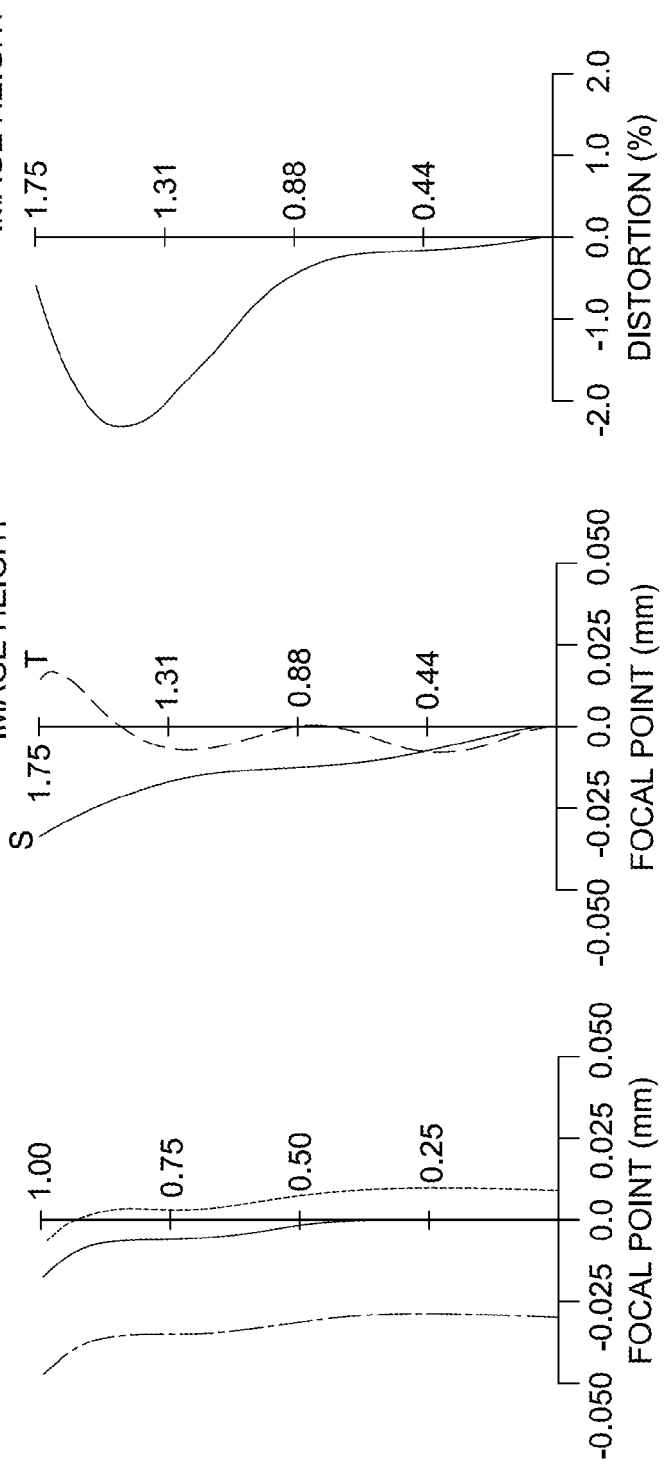

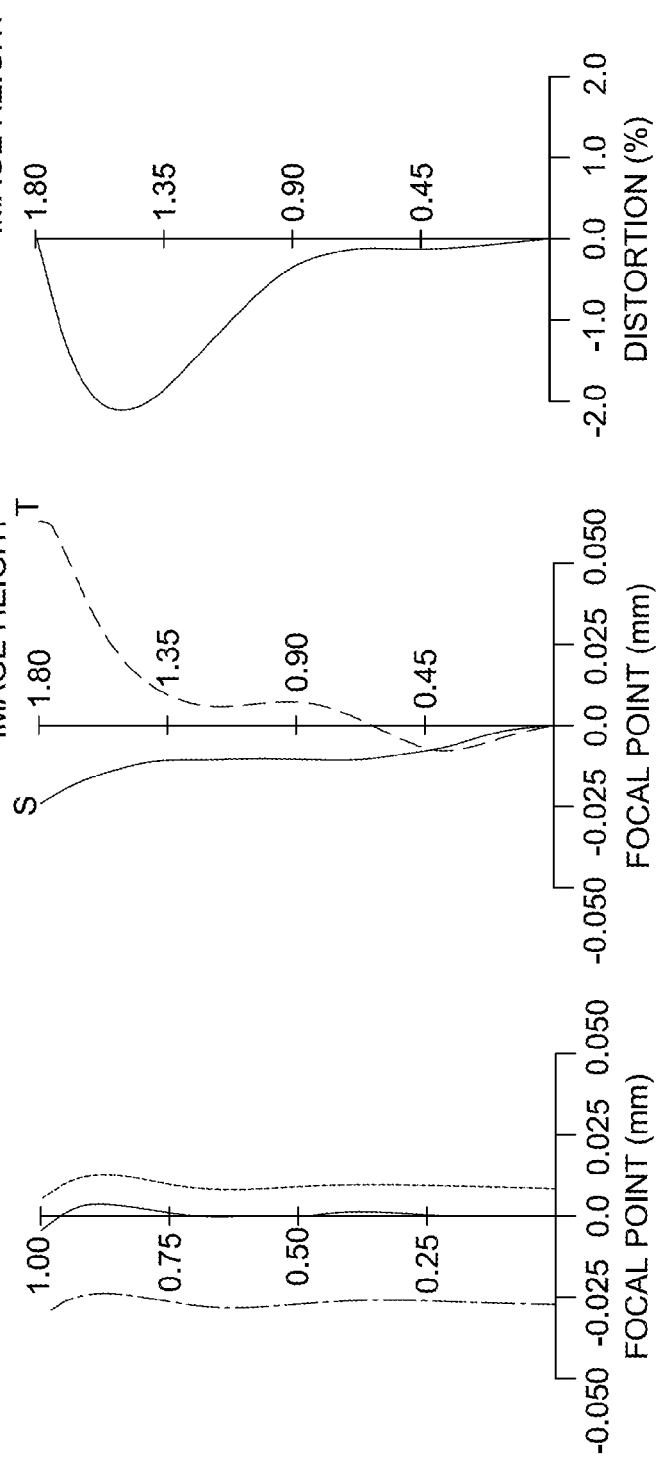

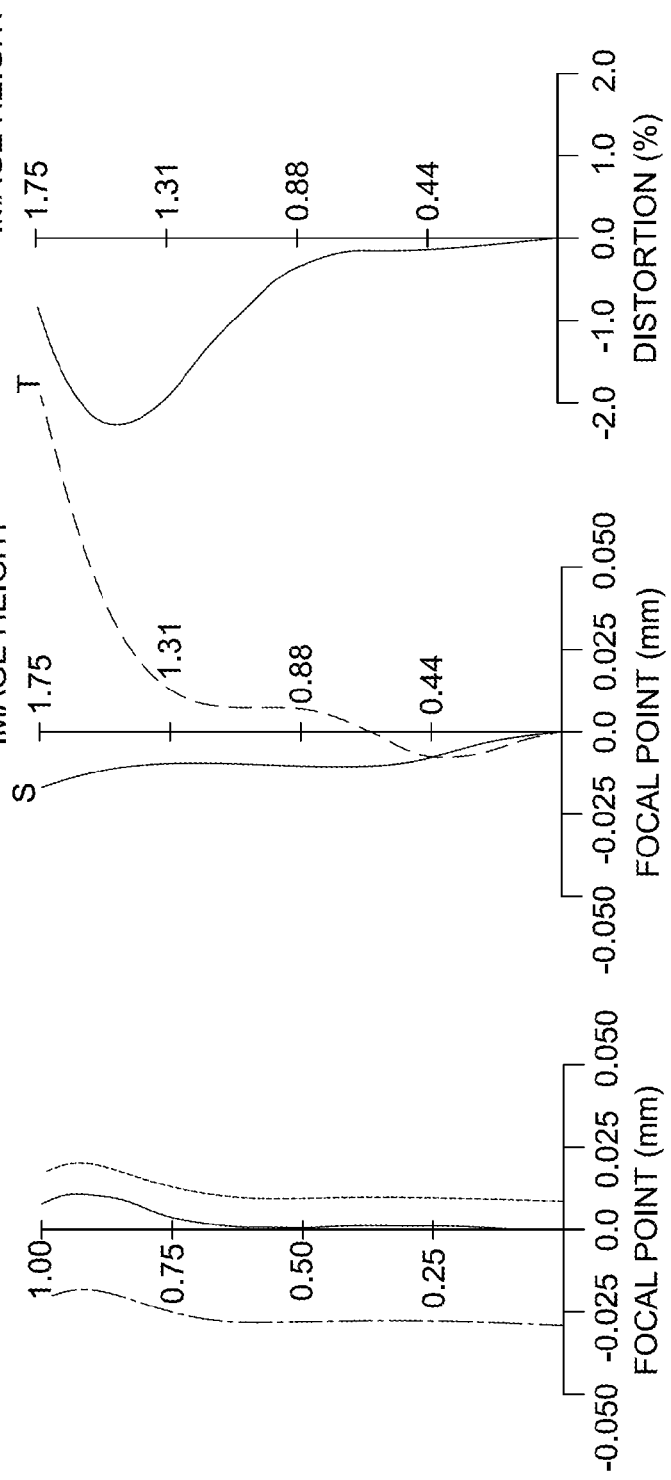
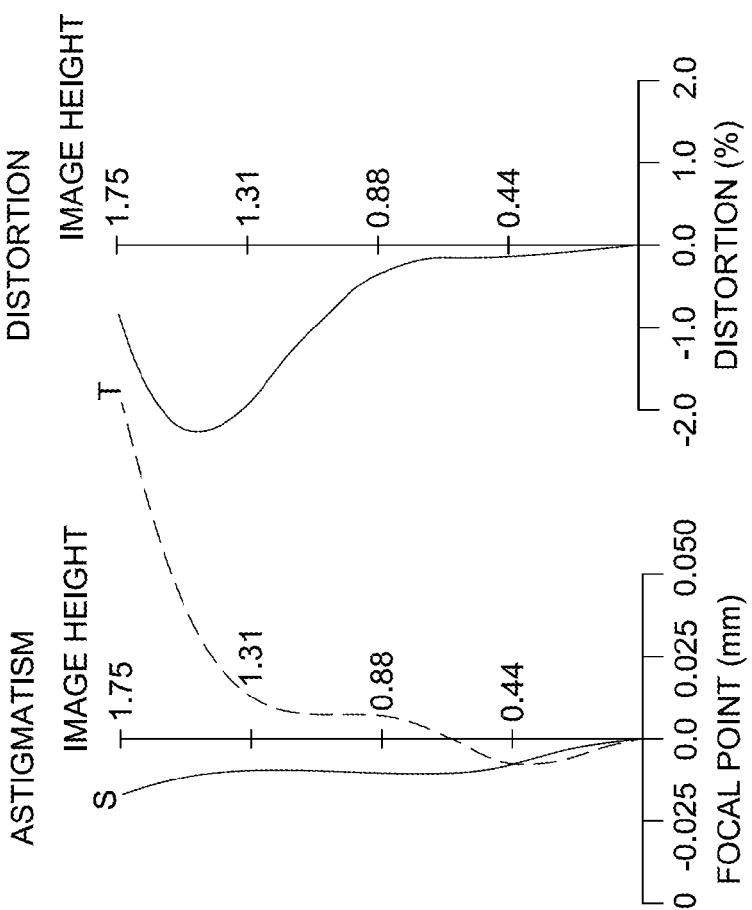
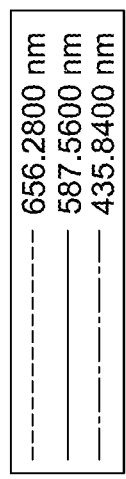

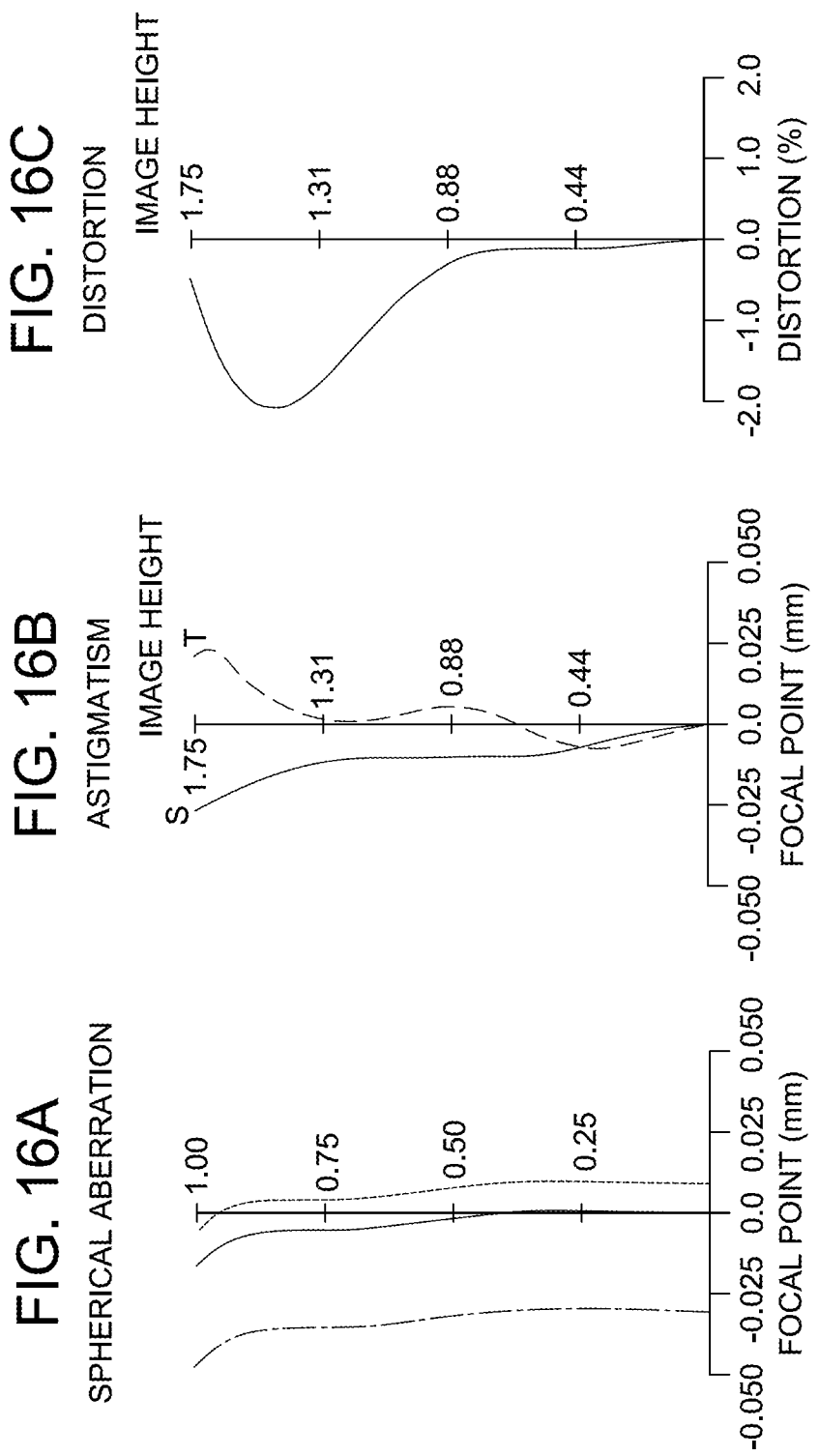

LENS UNIT, IMAGE CAPTURING LENS, IMAGE CAPTURING DEVICE AND PORTABLE TERMINAL

RELATED APPLICATIONS

This is a U.S. National stage under 35 U.S.C. §371 of International Application No. PCT/JP2009/052201, filed in the Japanese Patent Office on Feb. 10, 2009, which claims priority on Japanese Patent Application No. 2008-030886, filed Feb. 12, 2008.

FIELD OF THE INVENTION

The present invention relates to a lens unit including a lens holding plate and lens portion, an image capturing lens including the lens unit, an image capturing device including the image capturing lens, and a portable terminal including the image capturing device.

BACKGROUND

In recent years, an image capturing device of a compact and slim configuration has come to be mounted on a portable terminal as an electric device of compact and slim configuration such as a cellular mobile telephone and PDA (Personal Digital Assistant). This has resulted in mutual exchange of both audio information and visual information with a remote place. The image capturing element used in the image capturing device is a solid image capturing element such as a CCD (Charge Coupled Device) type image sensor and CMOS (Complementary Metal-Oxide Semiconductor) type image sensor. Further, resin lenses that can be mass-produced at a reduced cost have come to be employed as image capturing lenses for forming a subject image on an image capturing element because of lower costs thereof.

Further, in the cellular mobile telephone, the image capturing lens and image capturing device are mounted on the printed circuit board in recent years. A reflow soldering process is used to mount the image capturing lens and image capturing device on the printed circuit board. This process will be referred to as reflow process in the following description. In the reflow process, solder is placed in advance at the position wherein electronic components are arranged on the printed circuit board and the electronic components are arranged there. The heat is applied to dissolve the solder. After that, the solder is cooled and the electronic components are mounted on the printed circuit board. The electronic components are automatically mounted in a furnace for reflow process. Use of this reflow process has reduced the costs for mounting the components on the printed circuit board and ensures the product quality to be maintained at a predetermined level.

In this connection, one of the methods of producing a lens and optical system is a replica method wherein a plurality of lenses are formed simultaneously on one lens plate. The replica method permits the lens portion to be made of resin. However, in the resin lens, a change in the refractive index with respect to temperature change is generally negative. Accordingly, serious defocusing from the design level is caused by the operation temperature and the performance is deteriorated. Further, the linear expansion coefficient of the resin lens is generally greater than that of glass. Thus, the paraxial radius of the lens portion is increased by the free thermal expansion caused by temperature rise. This will result in defocusing, hence, deterioration in performances.

Regarding this point, the Patent Literature 1 discloses that, when a resin lens is formed on the surface of a parallel plane glass plate, excellent aberration performances can be provided by a smaller difference in refractive index between the parallel plane glass plate and resin lens.

Patent Literature Japanese Patent Publication No. 3926380

DISCLOSURE OF INVENTION

Problems to be Solved by the Invention

In the image capturing lens described in the Patent Literature 1, however, a silicon-based resin material is used. The silicon-based resin material is characterized by a greater linear expansion coefficient and greater geometrical change on the lens surface due to temperature change. The image surface is curved by temperature change, and hence, performance deterioration is caused.

In view of the problems described above, it is an object of the present invention to provide a lens unit, an image capturing lens including the lens unit, an image capturing device including the image capturing lens, and a portable terminal including the image capturing device, the aforementioned lens unit being capable of reducing the defocusing caused by the change in refractive index of the resin lens and a change in the shape of the lens surface resulting from temperature rise, and the deterioration in the performance of the entire lens system resulting from temperature rise.

Means for Solving the Problems

The lens unit of the present invention includes a lens holding plate; and a lens portion formed on at least one of the light-emitting surface and light-receiving surface of the lens holding plate, and made of a material different from that of the lens holding plate, wherein the following conditional expressions (1) and (2) are satisfied when the linear expansion coefficient of the lens portion is greater than that of the lens holding plate, the change in the refractive index of the lens portion resulting from temperature change is "dn/dt", and the linear expansion coefficient of the lens portion is "a":

$$-480 \times 10^{-6} \leq dn/dt \leq -18 \times 10^{-6} \quad (1)$$

$$90 \times 10^{-7} \leq a \leq 1990 \times 10^{-7} \quad (2)$$

The term "formed" in the sense in which it is used here refers to the state wherein the lens substrate surfaces (light-receiving surface and light-emitting surface) of the lens holding plate and the lens portion are directly bonded, or the lens substrate surfaces and lens portion are indirectly bonded, or through a different member.

When the linear expansion coefficient of the lens holding plate is assumed as "b", the lens unit of the present invention preferably satisfies the following conditional expression (3):

$$b/a < 0.34 \quad (3)$$

When the focal distance of the lens section is assumed as "f1" and the focal distance of the lens unit is assumed as "f", the lens unit of the present invention preferably satisfies the following conditional expression (4):

$$0.6 \leq |f1/f| \leq 1.2 \quad (4)$$

In the lens unit of the present invention, it is preferred that the lens portion should have a positive or negative power, and the surface should have no inflection point in the range from the vertex of the surface to the effective diameter of the lens portion.

In the lens unit of the present invention, it is preferred that the lens portion should have a negative power, and the lens portion having the aforementioned negative power includes an edge formed outside the effective diameter, as viewed from the optical axis of the lens portion. When the length from the outermost rim of the effective diameter of the lens portion to the outermost rim of the aforementioned edge is "Le", and the effective radius of the lens portion is "r", the following conditional expression (5) is preferably satisfied:

$$Le/r \leq 3.5 \quad (5)$$

In the lens unit of the present invention, the lens holding plate and lens portion can be indirectly bonded through an optically functioning thin film or adhesive.

In the lens unit of the present invention, it is preferred that the lens portion should be made of resin and the lens holding plate should be made of glass.

In the lens unit of the present invention, it is preferred that inorganic particles each having a maximum length of 30 nanometers or less should be dispersed in the lens portion, and the following conditional expressions (6) and (7) should be satisfied:

$$-270 \times 10^{-6} \leq dn/dt \leq -18 \times 10^{-6} \quad (6)$$

$$90 \times 10^{-7} \leq a \leq 1100 \times 10^{-7} \quad (7)$$

A plurality of lens units of the present invention are preferably manufactured by the production method including a process of forming a plurality of lens portions simultaneously on the lens holding plate, a process of sealing a plurality of lens holding plates with one another through a grid-like spacer member, and a process of cutting off the integrally formed lens holding plate and spacer member along the grid of the spacer member.

In the lens portion of the lens unit of the present invention, the surface in contact with air is preferably aspherical.

In the lens unit of the present invention, the lens portion is preferably made of a cured resin.

The image capturing lens of the present invention is characterized by having the above-mentioned lens unit of the present invention.

The image capturing device of the present invention includes the above-mentioned image capturing lens, and an image capturing element for receiving the light obtained through the image capturing lens, and outputting the electric signal corresponding to the amount of light received.

The portable terminal of the present invention is provided with the above-mentioned image capturing device of the present invention.

Effects of the Invention

According to the present invention, the lens portion undergoes a change in the surface shape opposite to those of a conventional resin lens wherein a change in the paraxial image point position of the entire lens system caused by a change in the surface shape of the lens portion whose paraxial radius is reduced with temperature change by the difference in linear expansion coefficient between the lens holding plate and lens portion are contrary to a change in the paraxial image point position of the entire lens system caused by a change in the refractive index of the lens portion due to temperature change. This suppresses the defocusing caused by the change in the paraxial image point position of the entire lens system resulting from temperature change. Further, when the conditional expressions (1) and (2) are satisfied at the same time, defocusing due to temperature rise is suppressed and, at the same time, the occurrence of image surface curvature is reduced, whereby the deterioration of performances in the entire lens system can be immunized.

BRIEF DESCRIPTION OF THE DRAWINGS

FIGS. 10A, 10B, and 10C are explanatory diagrams showing various forms of aberrations in the image capturing device of the embodiment 1;

FIGS. 11A, 11B, and 11C are explanatory diagrams showing various forms of aberrations in the image capturing device of the embodiment 2;

FIGS. 12A, 12B, and 12C are explanatory diagrams showing various forms of aberrations in the image capturing device of the embodiment 3;

FIGS. 13A, 13B, and 13C are explanatory diagrams showing various forms of aberrations in the image capturing device of the embodiment 4;

FIGS. 14A, 14B, and 14C are explanatory diagrams showing various forms of aberrations in the image capturing device of the embodiment 5;

FIGS. 15A, 15B, and 15C are explanatory diagrams showing various forms of aberrations in the image capturing device of the embodiment 6;

FIGS. 16A, 16B, and 16C are explanatory diagrams showing various forms of aberrations in the image capturing device of the embodiment 7;

DESCRIPTION OF REFERENCE NUMERALS

Figure 1:
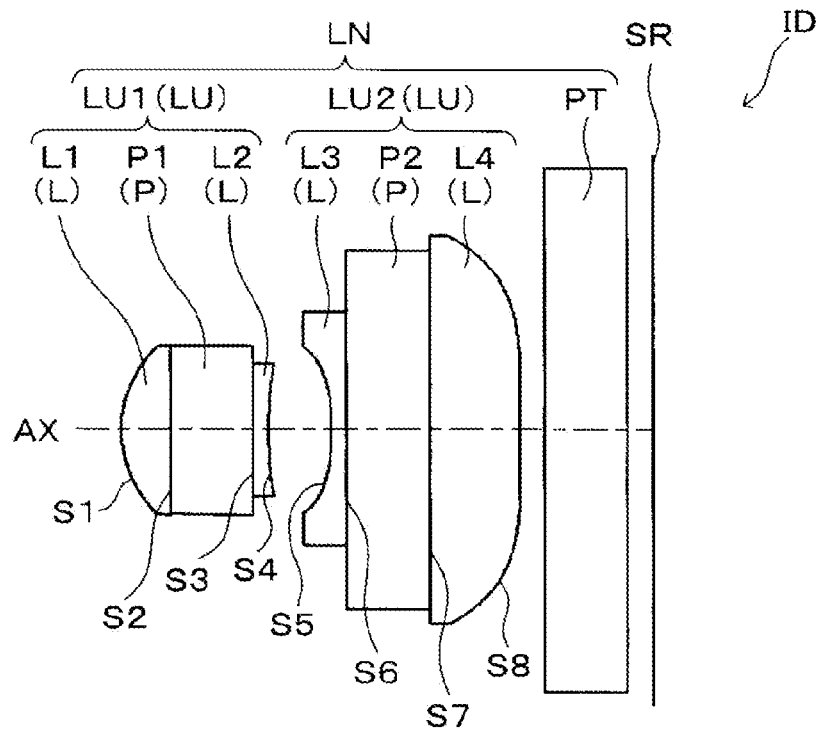
FIG. 1 is a cross sectional view showing the approximate structure of an image capturing device in an embodiment 1 of the present invention.
Figure 2:
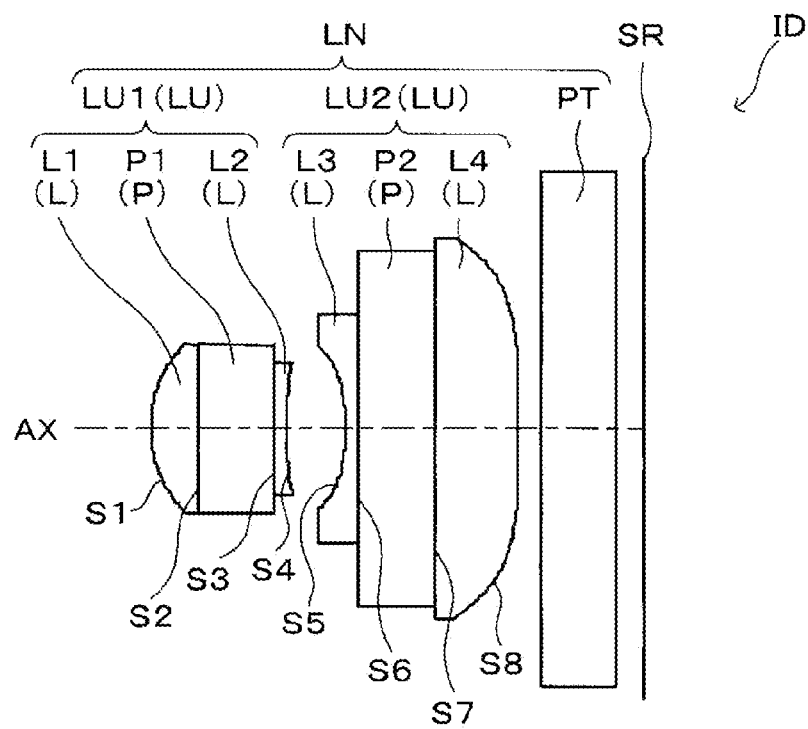
FIG. 2 is a cross sectional view showing the approximate structure of an image capturing device in an embodiment 2 of the present invention.
Figure 3:
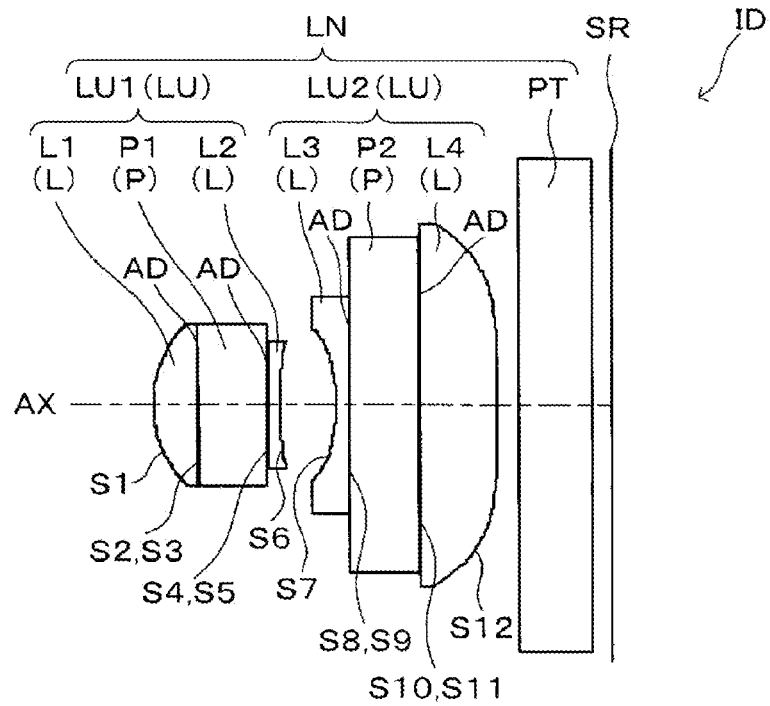
FIG. 3 is a cross sectional view showing the approximate structure of an image capturing device in an embodiment 3 of the present invention.
Figure 4:
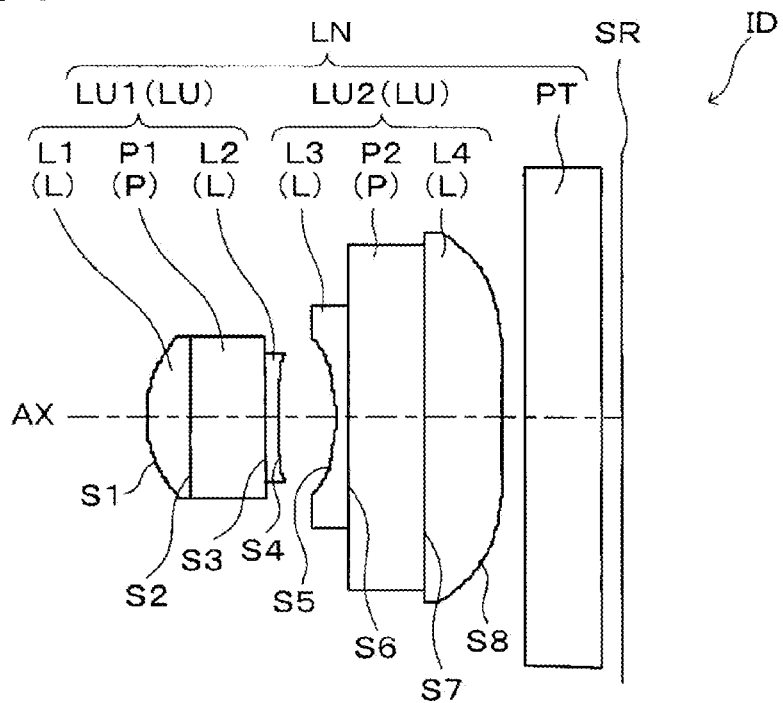
FIG. 4 is a cross sectional view showing the approximate structure of an image capturing device in an embodiment 4 of the present invention.
Figure 5:
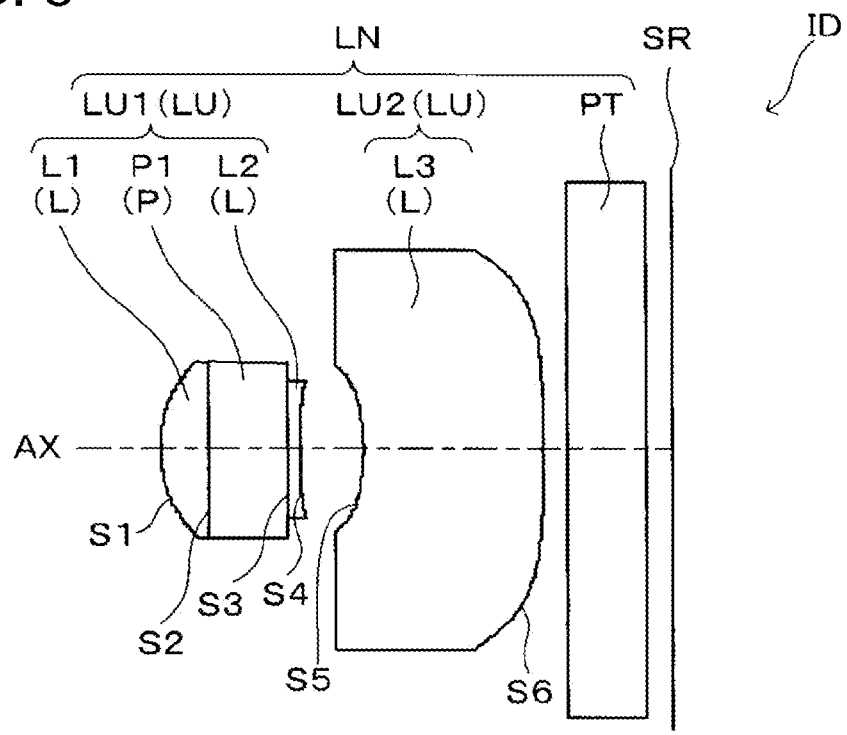
FIG. 5 is a cross sectional view showing the approximate structure of an image capturing device in an embodiment 5 of the present invention.
Figure 6:
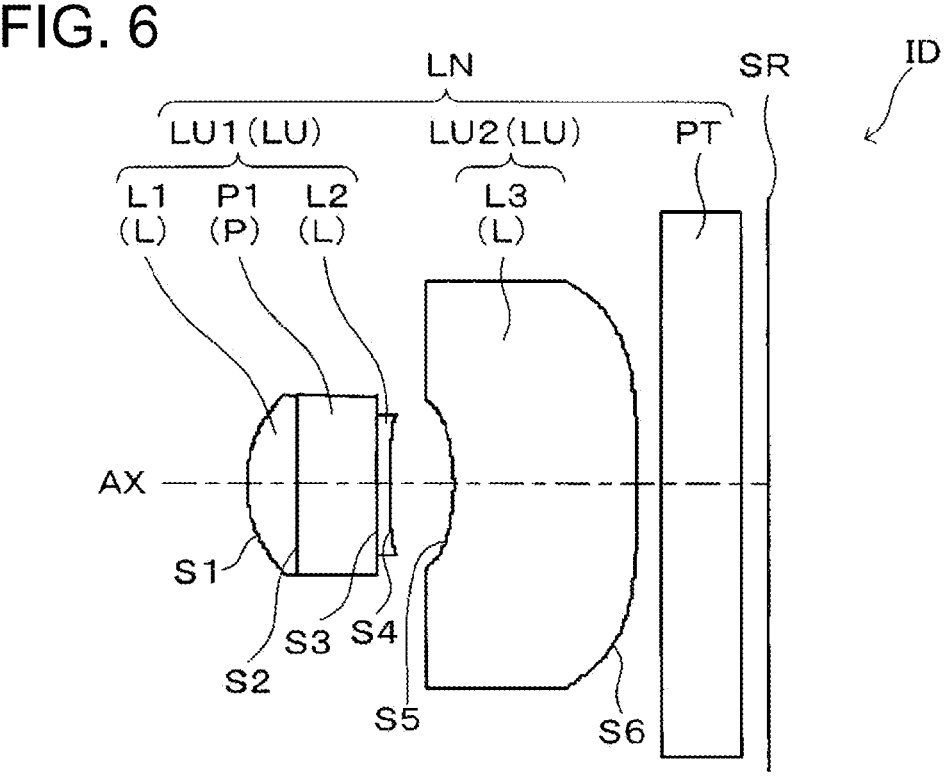
FIG. 6 is a cross sectional view showing the approximate structure of an image capturing device in an embodiment 6 of the present invention.
Figure 7:
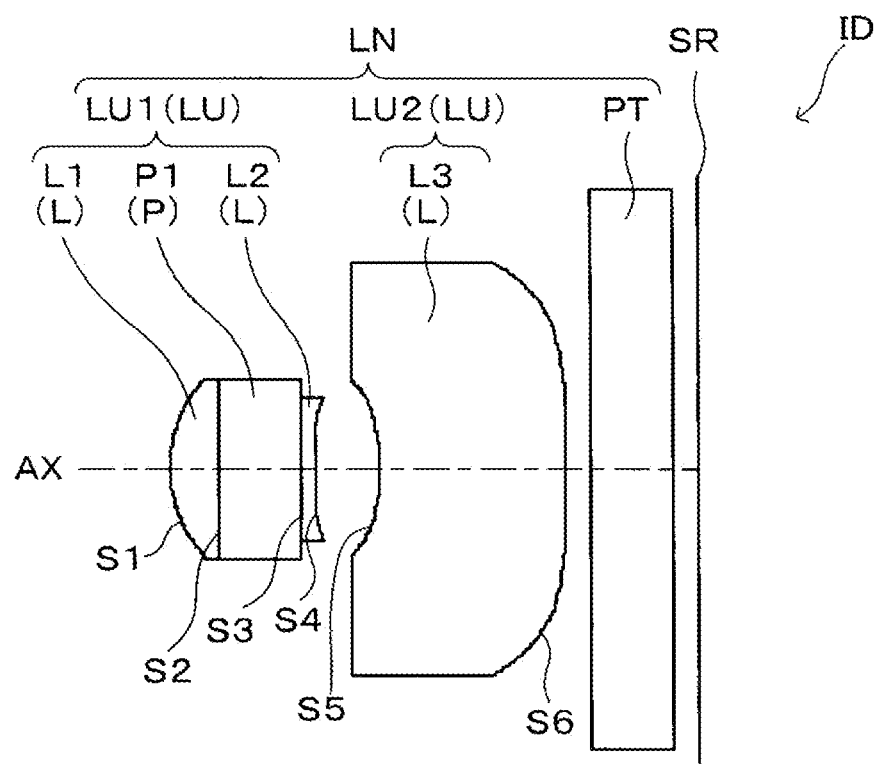
FIG. 7 is a cross sectional view showing the approximate structure of an image capturing device in an embodiment 7 of the present invention.

AX optical axis
CU portable terminal

ID image capturing device
L lens portion
L1 1st lens portion
L2 2nd lens portion
L3 3rd lens portion
L4 4th lens portion
LN image capturing lens
LU lens unit
LU1 1st lens unit
LU2 2nd lens unit
P lens holding plate
P1 1st lens holding plate
P2 2nd lens holding plate
SR image capturing element

DETAILED DESCRIPTION OF THE PREFERRED EMBODIMENT

The following describes the embodiments of the present invention with reference to drawings. FIGS. 1 through 7 are cross sectional views showing the approximate structure of an image capturing device ID in embodiments 1 through 7. Each image capturing device ID is applicable to the portable terminal CU (FIG. 19) to be described later.

The image capturing devices ID in the embodiments 1 through 4 are an image capturing lens LN and image capturing element SR in that order as viewed from the object. The image capturing lens LN is used to form an optical image (image surface) of an object on the light receiving surface of the image capturing element SR. The image capturing lens LN is composed of two lens units LU (i.e., 1st lens unit LU1 and end lens unit LU2) and portable terminal PT.

The 1st lens unit LU1 includes the 1st lens portion L1 having a positive power, 1st lens holding plate P1, and 2nd lens portion L2 having a negative power in that order as viewed from the object. To be more specific, the 1st lens unit LU1 has a lens portion L provided on both surfaces (light-receiving surface and light-emitting surface) of the lens holding plate P.

The 2nd lens unit LU2 includes the 3rd lens portion L3 having a negative power, 2nd lens holding plate P2 and 4th lens portion L4 having a negative power. To be more specific, the 2nd lens unit LU2 also has a lens portion L provided on both surfaces of the lens holding plate P.

Here the lens holding plate P is made of a parallel plane plate, and is formed of glass, for example. The lens holding plate P can be formed by bonding two glass plates. In the meantime, the lens portion L is formed of a material different from that of the lens holding plate P, such as a resin. It is only required that the lens portion L is formed on at least one of the light-receiving surface and light-emitting surfaces.

The embodiments 1, 2 and 4 show the image capturing device ID at the design value (20° C.), at the temperature (50° C.) changed +30° C. from the design value and at the temperature (−10° C.) changed −30° C. from the design value. In the image capturing lens LN of the image capturing device ID, the lens holding plate P and lens portion L are directly bonded.

The embodiment 3 shows the image capturing device ID at the temperature (50° C.) changed +30° C. from the design value. In the image capturing lens LN of the image capturing device ID, the lens holding plate P and lens portion L are indirectly bonded by adhesive AD.

The embodiments 5 through 7 show the image capturing device ID at the design value (20° C.), at the temperature (50° C.) changed +30° C. from the design value and at the temperature (−10° C.) changed −30° C. from the design value.

These image capturing devices ID are designed in the same structure as those of embodiments 1, 2 and 4, except that the 3rd lens portion L3 having a negative power is designed in a meniscus structure concaved to the object side and the 2nd lens unit LU2 is formed of a single 3rd lens portion L3. In the image capturing lens LN of the image capturing device ID, the lens holding plate P of the 1st lens unit LU1 and lens portion L are directly bonded.

The portable terminal PT of the image capturing device ID in embodiments 1 through 7 is arranged on the front of the image capturing element SR wherever required. The portable terminal PT includes an optical filter (e.g., optical low-pass filter and infrared cut filter, etc.) and the cover glass of the image capturing element SR. The image capturing element SR receives the light received through the image capturing lens LN and outputs the electric signal in conformance to the amount of received light, and is made of a solid image capturing element such as a CCD type image sensor and CMOS type image sensor, for example. The image capturing lens LN is arranged in such a way that the optical image of a subject will be formed on the light-receiving surface of the image capturing element SR. Thus, the optical image formed by the image capturing lens LN is converted into the electric signal by the image capturing element SR.

The following describes the details of the lens unit LU of the image capturing device ID in the embodiments 1 through 7. The 1st lens unit LU1 of the image capturing device ID is assumed as the lens unit LU described below. It goes without saying that the following description also applies to the second lens unit LU2.

In the lens unit LU of the present invention, the linear expansion coefficient of the lens portion L is greater than that of the lens holding plate P. When the change in the refractive index in response to the temperature change of the lens portion L is dn/dt and the linear expansion coefficient of the lens portion L is "a", the lens unit LU satisfies the following conditional expressions (1) and (2):

$$-480\times 10^{-6} \leq dn/dt \leq -18\times 10^{-6} \tag{1}$$

$$90\times 10^{-7} \leq a \leq 1990\times 10^{-7} \tag{2}$$

The general resin lens is subjected to such a change in surface shape that the free thermal expansion occurs with temperature rise, and the paraxial radius is increased accordingly. In this case, the focal distance of the lens is increased with temperature rise, and the paraxial image point position of the entire lens system is shifted toward the image in excess of the design value.

In the lens unit LU, the linear expansion coefficient of the lens portion L is greater than that of the lens holding plate P. Since such a lens portion L is formed on the surface of the lens holding plate P, the lens portion L is subjected to a specific change in surface shape with temperature rise. To be more specific, in the lens portion L, the thermal expansion is suppressed in the direction (along the effective diameter) perpendicular to the optical axis AX resulting from temperature rise, and the thermal expansion in the direction of optical axis becomes conspicuous. The surface shape is subjected to such a change that the paraxial radius is reduced. The change in the surface shape resulting from temperature rise of the lens portion L is opposite to the change of the general lens described above, and works so as to reduce the paraxial image point position of the entire lens system toward the object below the design value.

Thus, in the present invention, a change in the paraxial image point position of the entire lens system caused by a change in the surface shape of the lens portion L whose paraxial radius is reduced with temperature change is contrary to the change in the paraxial image point position of the entire lens system caused by change in the refractive index of the lens portion L due to temperature change. Actually, it has been verified by simulation that the influence on the paraxial image point position given by the change in the paraxial image point position of the lens portion L resulting from temperature rise is contrary to the influence on the paraxial image point position given by the change in the refractive index of the lens portion L resulting from temperature rise. This simulation is based on stress analysis wherein a reversible change is assumed.

As described above, since the change in the surface shape of the lens portion L due to temperature rise is contrary to the change of the paraxial image point position due to the change in refractive index, these changes are reduced by each other, and a change in the paraxial image point position (paraxial focal point position) of the entire system due to temperature change can be minimized, as a result. Thus, the defocusing resulting from temperature rise due to temperature rise can be reduced.

Further, the conditional expressions (1) and (2) define proper ranges for a change in the refractive index of the lens portion L and the linear expansion coefficient of the lens portion L for reducing the occurrence of the image surface curvature while reducing the defocusing resulting from temperature rise. To be more specific, if the upper limit of the conditional expression (1) alone is exceeded, only the influence of the change in surface shape of the lens portion L given by thermal expansion has a serious impact on defocusing. This makes it difficult to solve the defocusing problem. If the lower limit of the conditional expression (1) cannot be reached and the upper limit of the conditional expression (2) is exceeded, the influence on the paraxial image point position (paraxial focal distance) given by the change in refractive index with respect to temperature change is set off against and the influence on the paraxial image point position (paraxial focal distance) given by the change in surface change of the lens portion L by thermal expansion. A great change occurs in the surface shape of the lens portion L by thermal expansion, and an image surface curvature also occurs. If the lower limit of the conditional expression (1) alone cannot be reached, the influence of the change in the surface shape of the lens portion L by the thermal expansion upon the paraxial focal distance is smaller than the influence of the change in the refractive index with respect to temperature change upon the paraxial focal distance. This makes it difficult to solve the defocusing problem.

Thus, if both the conditional expressions (1) and (2) are met simultaneously, occurrence of image surface curvature can be reduced, while the defocusing caused by temperature rise is reduced. This ensures reduction of deterioration in performances of the entire lens system due to temperature rise.

If the upper limit of the conditional expression (1) is exceeded and the lower limit of the conditional expression (2) cannot be reached, the problem can be solved by forming the lens portion L using the material meeting such conditions, because defocusing resulting from temperature change is originally very small. To be more specific, if there is a the material characterized by intrinsically reduced defocusing due to temperature change, the lens portion L should be made using such a material. However, since there is such a material in practice, the upper limit of the conditional expression (1) and the lower limit of the conditional expression (2) are defined in the sense of removing such a material.

If at least one of the following conditional expressions (1') and (2') is satisfied, the aforementioned advantage can be completely ensured.

$$-260 \times 10^{-6} \leq dn/dt \leq -60 \times 10^{-6} \quad (1')$$

$$150 \times 10^{-7} \leq a \leq 1990 \times 10^{-7} \quad (2')$$

In the lens unit LU of the present invention, when the linear expansion coefficient of the lens holding plate P is assumed as "b", the following conditional expression (3) is preferably satisfied:

$$b/a < 0.34 \quad (3)$$

The conditional expression (3) defines a proper range for the ratio between the linear expansion coefficient of the lens holding plate P and the linear expansion coefficient of the lens portion L. If the upper limit of the conditional expression (3) is exceeded, the surface shape of the lens portion L due to temperature change is reduced, and a decrease in the paraxial radius of the lens portion L is reduced. Thus, the influence of a change in the paraxial radius of the lens portion L due to temperature change upon the paraxial image point position ceases to be set off against the influence of the change in refractive index of the lens portion L due to temperature change upon the paraxial image point position. This leads to a failure of reducing the defocusing.

Accordingly, if the conditional expression (3) is satisfied, a greater change in the surface shape of the lens portion L due to temperature change can be ensured and a greater reduction in the paraxial radius of the lens portion L can be ensured. This arrangement completely reduces the defocusing due to temperature rise.

In the lens unit LU of the present invention, when the focal distance of the lens portion L is f1 (mm), and the focal distance of the entire lens system (image capturing lens LN) equipped with the lens portion L is f (mm), the following conditional expression (4) is preferably satisfied:

$$0.6 \leq |f1/f| \leq 1.2 \quad (4)$$

The lens portion L can have a positive power or a negative power.

If the conditional expression (4) is satisfied, the lens portion L can be said to bear greater power or the greatest power in the entire lens system, and therefore, the present invention is applied to the lens portion L bearing such power. Thus, a great portion of defocusing can be suppressed.

For the lens portion L formed on the surface of the lens holding plate P on the object side, the focal distance f1 of the lens portion L indicates the focal distance when the lens portion L is filled with air on the object side and is filled with the medium of the lens holding plate P on the image side. For the lens portion L formed on the surface of the lens holding plate P on the image side, the focal distance f1 indicates the focal distance when the lens portion L is filled with the medium of the lens holding plate P on the object side and is filled with air on the image side.

For the lens portion L not bonded, the focal distance f1 is defined as follows in order to meet the aforementioned arrangement. The focal distance f1 indicates the focal distance when the lens portion L is filled with air on the object side and is filled with the same medium as that of the lens portion L on the image side. In the meantime, the focal distance f1 on the image side indicates the focal distance when the lens portion L is filled with the same medium as that of the lens portion on the object side and is filled with air on the image side.

In the lens unit LU of the present invention, the lens portion L preferably has a positive or negative power, and, in the area from the vertex of the surface to the effective diameter of the lens portion L, the surface is preferably free of an inflection point.

According to the present invention, the thermal expansion is suppressed in the direction (along the effective diameter) perpendicular to the optical axis AX of the lens portion L due to temperature change, and the thermal expansion in the direction of optical axis becomes conspicuous. If the surface has an inflection point in the area from the vertex of the surface of the lens portion L to the effective diameter, the surface is partly protruded and partly dented (extreme values) in the vicinity of the inflection point. Then, at the time of thermal expansion in the axial direction, stress is concentrated at such a position and the surface shape may not undergo proper change. This does not occur if the lens portion L is free of an inflection point. Defocusing can be positively suppressed by a desired change in the surface shape.

Figure 8:
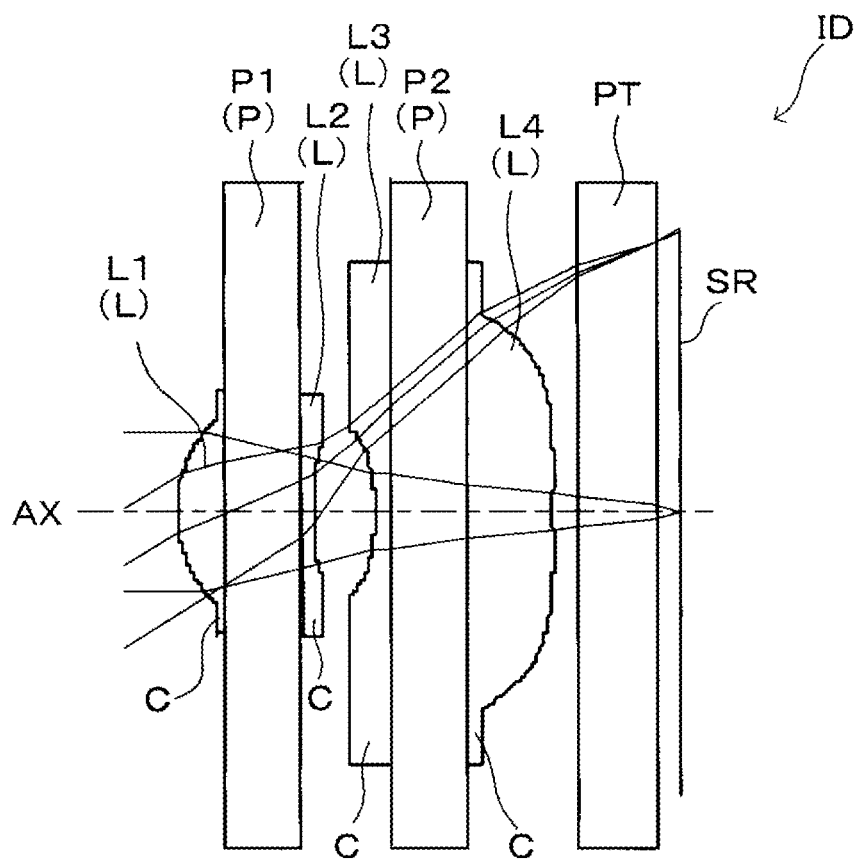
FIG. 8 is a cross sectional view showing the approximate structure of an image capturing device wherein each lens portion includes a lens edge.
Figure 9:
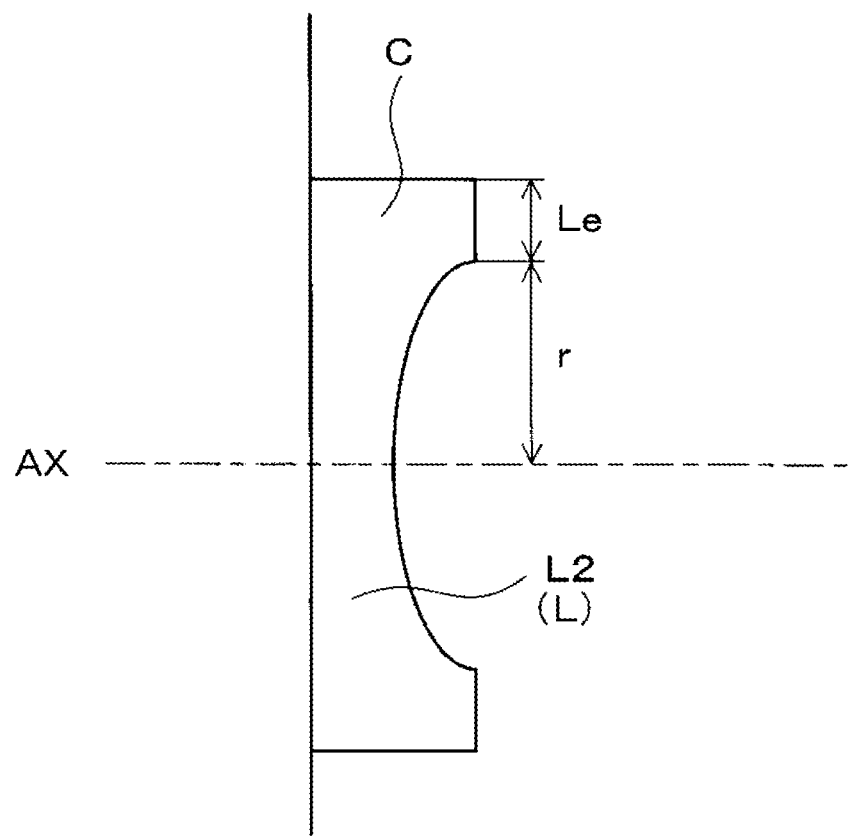
FIG. 9 is a cross sectional view showing an enlarged view of the second lens unit in the aforementioned image capturing device.

Incidentally, FIG. 8 is a cross sectional view showing the approximate structure of the image capturing device ID having a lens edge (tabular outer edge) C formed on the outside of the effective diameter as viewed from the optical axis AX of the individual lens portion L. FIG. 9 is a cross sectional view showing an enlarged view of the second lens portion L2 having a negative power in the image capturing device ID.

When the lens portion L having a negative power has an edge C, assume that Le (mm) indicates the length from the outermost rim of the effective diameter of the lens portion L to the outermost portion of the edge C and r (mm) indicates the effective radius of the lens portion L. Then the lens unit LU of the present invention preferably satisfies the following conditional expression (5):

$$Le/r \leq 3.5 \quad (5)$$

The length Le is equal to the width of the edge C along the effective diameter of the lens portion L, namely, the value obtained by dividing the difference between the outer diameter (diameter) of the edge C and the effective diameter (diameter) of the lens portion L by two.

When the upper limit of the conditional expression (5) has been exceeded, the volume inside the effective diameter of the lens portion L will be too small for the volume of the edge C. Thus, the thermal expansion on the surface in the vicinity of the outermost edge of the effective diameter becomes conspicuous in the direction of optical axis. This results in the occurrence of image surface curvature and deterioration of the aberration performance. Thus, when the conditional expression (5) is met, the width of the edge C is suppressed, whereby occurrence of the image surface curvature is suppressed and deterioration of the aberration performance is minimized.

The conditional expression (5) can also be applied to the lens portion L having a negative power other than the 2nd lens portion L2. To be more specific, in the image capturing lens LN, when at least one lens portion L has a negative power, and the lens portion L having the negative power has an edge C formed on the outer side of the effective diameter, as viewed from the optical axis of the lens portion L, the conditional expression (5) is preferably satisfied.

As described above, in the lens unit LU of the embodiment 3, the lens holding plate P is indirectly bonded with the lens portion L through the adhesive AD. When the lens holding plate P and lens portion L are bonded indirectly, as well as when they are bonded directly, the thermal expansion along the effective diameter of the lens portion L due to temperature rise is reduced by the difference in the linear expansion coefficient between the lens holding plate P and lens portion L. In the meantime, remarkable thermal expansion can be produced in the direction of optical axis. This provides the advantage of the present invention wherein defocusing can be suppressed even if the lens holding plate P and lens portion L are bonded indirectly.

The lens holding plate P and lens portion L can be bonded indirectly through an optically functioning thin film. In this case as well, the advantage of the present invention is provided, and defocusing is suppressed. An example of the optically functioning thin film or adhesive will be an aperture stop or infrared cut filter.

In the lens unit LU of the present invention, the lens portion L is made of resin and the lens holding plate P is formed of glass, as described above.

A lens unit LU can be easily implemented by forming a lens portion L and lens holding plate P by using the general material such as resin and glass. Moreover, since there is a great difference between the resin and glass, the aforementioned advantage of the present invention can be positively ensured. Further, when the lens holding plate P is made of glass, the light of the visible light area can be transmitted in the lens holding plate P, and the lens unit LU of the present invention can be used for such applications.

In the lens unit LU, it is preferred that inorganic particles having a maximum length of 30 nanometers or less should be distributed in the lens portion L, and the following conditional expressions (6) and (7) should be satisfied:

$$-270 \times 10^{-6} \leq dn/dt \leq -18 \times 10^{-6} \quad (6)$$

$$90 \times 10^{-2} \leq a \leq 1100 \times 10^{-2} \quad (7)$$

This is because of the following reason.

In the first place, the following describes the details of the temperature change of the refractive index. The temperature change TA of the refractive index can be expressed by the following formula by dividing the refractive index n by temperature t, based on the Lorentz-Lorentz equation.

$$TA(=dn/dt)=\{(n^2+2)(n^2-1)/6n\}x\{(-3\alpha)+(1/[R])(\partial[R]/\partial t)\}$$

wherein $\alpha$ denotes a linear expansion coefficient and [R] indicates a molecular refraction.

When a plastic material is used as a resin, for example, the contribution of the second term is generally smaller than that of the first term, and is almost negligible. For example, in the case of polymethyl methacrylate (PMMA), the linear expansion coefficient $\alpha$ is $7 \times 10^{-5}$. When this is substituted into the aforementioned formula, TA=$-1.2 \times 10^{-4}$ [/° C.]. This indicates a general agreement with the actual measurement.

In recent years, it has been made clear that the impact of temperature change can be reduced by mixing inorganic particles in a plastic material. To put it in more detail, when inorganic particles are mixed in a transparent plastic material, scattering of light generally occurs and transmittance is reduced. This has made it difficult to use it as an optical material. The scattering of light can be practically eliminated if the size of the particles is made smaller than the wavelength of the transmitting light bundle. Further, whereas the plastic material is subjected to reduction in refractive index by temperature rise, the refractive index of the inorganic particles is increased by temperature rise.

It is possible to get a plastic material characterized by extremely low dependency of refractive index on temperature by distributing the inorganic particles having a maximum length of 30 nanometers or less in the resin (e.g., plastic material as a base material). For example, when the particles of niobium oxide ($Nb_2O_5$) are distributed in acryl, a change in the refractive index due to temperature change can be reduced. Thus, inorganic particles are mixed in the plastic material and a change in the refractive index of the lens portion L due to the temperature change is suppressed. This arrangement ensures that the influence on the paraxial image point position given by the change in the surface shape due to temperature change of the lens portion L is almost equal to the influence on the paraxial image point position given by the change in the refractive index due to temperature change of the lens portion L. This positively reduces defocusing due to temperature rise. Further, when the conditional expressions (6) and (7) are satisfied simultaneously, the deterioration in the performance of the entire lens system due to temperature rise can be positively minimized by positive suppression of the occurrence of an image curvature as well as defocusing due to temperature rise at the same time. It should be added that light scattering by nanometer-level particles can be reduced to a negligible level if the maximum length is kept preferably at 20 nanometers or less, or more preferably at 10 nanometers or less.

The Unexamined Japanese Patent Application Publication No. 2007-126636 discloses a material characterized by a lower dependency of refractive index on temperature wherein nano-composites are used. In the lens unit LU of the present invention, satisfactory correction of defocusing can be achieved by using such a technique if the lens portion L is made of the resin material having a temperature dependency of refractive index that gives influence to the extent of canceling out the influence on the paraxial image point position given by the paraxial image point position of the lens portion L reduced by the difference in the linear expansion coefficient of the lens holding plate P and lens portion L. Further, the Unexamined Japanese Patent Application Publication No. 2007-126636 discloses an optical material meeting the following conditional expression (7'). It goes without saying that such disclosed information can be used to produce a lens portion and lens unit (wherein "a" is a linear expansion coefficient).

$$130 \times 10^{-7} \leq a \leq 650 \times 10^{-7} \tag{7'}$$

Generally, the linear expansion coefficient is changed by the volume fraction (mixing ratio) of nano-composite material. The nano-composite material can include the resin material having a linear expansion coefficient of $1100 \times 10^{-7}$ through $1300 \times 10^{-7}$.

In the lens portion L of the lens unit LU of the present invention, the surface in contact with air is preferably aspherical. In the lens portion L, the difference in the refractive index of the media is the greatest on the surface in contact with air (interface with air). Thus, when such a surface is made aspherical, the effect of the aspherical surface (e.g., effect of aberration correction) can be used most effectively.

Such a lens portion L is preferably made of a curable resin. The curable resin can be exemplified by a photocurable resin that is cured by ultraviolet rays and thermoplastic resin that is cured by heat. These curable resins are characterized by excellent moldability, and can be easily molded into aspherical surfaces, for example, by dies. The curable resin is also characterized by superb matching with the replica method to be described later.

Use of the curable resin ensures direct and easy bonding of the lens portion L with the lens holding plate P in the lens unit LU. Further, the curable resin is preferably provided with higher heat resistance. Use of a heat resistant resin provides compatibility with the camera module capable of withstanding the reflow method, with the result that a less expensive camera module will be provided. The reflow method in the sense in which it is used here refers to a process wherein a paste-like solder is printed on the printed circuit board (circuit substrate) and a component (camera module) is mounted thereon. Then heat is applied to melt the solder in such a way that the outer terminals of the sensor and circuit substrate are automatically welded together.

The aforementioned lens unit LU can be produced, for example, by the reflow method or replica method. In the reflow method, low softening point glass film formation is performed by the CVD (chemical vapor deposition) method, microfabrication is carried out by photolithography and dry etching, and glass reflow by heat treatment is performed. This process allows a great number of lenses (lens portions L) to be formed on the glass substrate (lens holding plate P). In the replica method, a great amount of lens shapes are transferred onto a lens wafer simultaneously by dies using a curable resin, whereby a great number of lenses are produced simultaneously. In any of these methods, a great number of lenses are produced at the same time, with the result that production costs are reduced.

Figure 18:
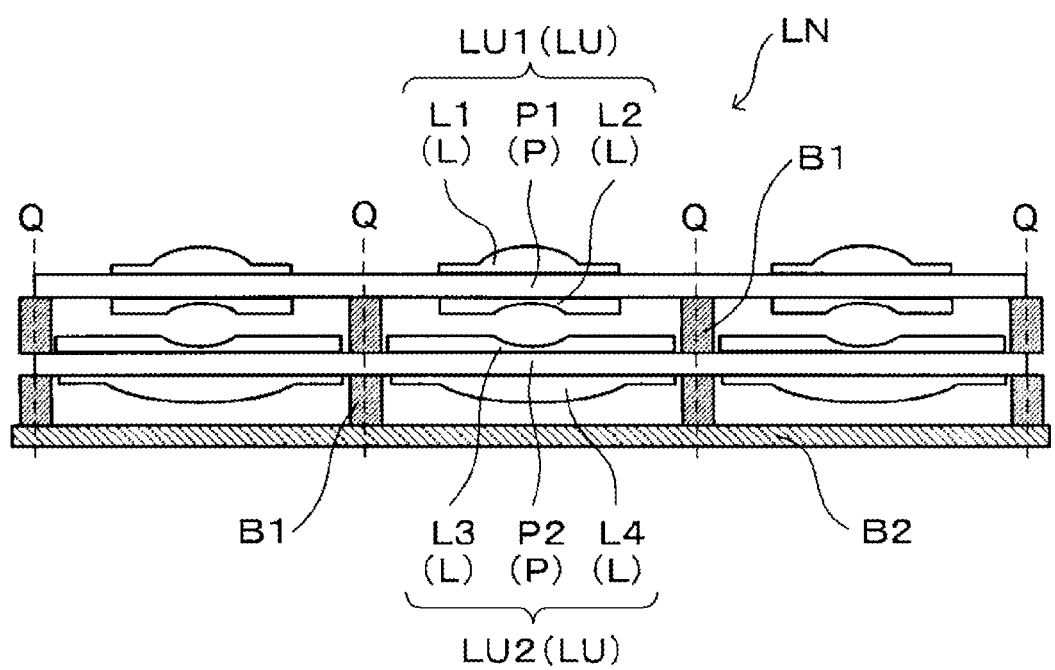
FIG. 18 is a cross sectional view showing the method of producing a lens unit.

FIG. 18 is a cross sectional view showing another method of producing the aforementioned lens unit LU. The lens unit LU of the present invention can also be manufactured by the following method. A plurality of lens units LU can be produced by a production method including a process of simultaneously forming a plurality of lenses on the lens holding plate P (at least one of the front and back surfaces), a process of sealing a plurality of lens holding plates P with one another through a grid-like spacer member B1, and a process of cutting the integrally formed lens holding plates P and spacer member B1 along the grid of the spacer member B1 (at the position of broken line Q).

The grid-like spacer member B1 defines the spacing between the 1st lens unit LU1 and second lens unit LU2, and keeps it constant, and is characterized by a two-stage grid structure. Each lens portion L is arranged at the grid hole of the spacer member B1. The substrate B2 corresponds to the parallel plane plate PT (FIG. 1) and is composed of a wafer-level sensor chip-sized package including the micro-lens array, sensor cover glass, infrared cut filter, and others.

As described above, a great number of lens portions L are formed simultaneously on the lens holding plate P, and a plurality of lens holding plates P are assembled through the grid-like spacer member B1. Then lens holding plates P are cut off along the grid of the spacer member B1, whereby a great number of lens units LU are produced at a reduced cost. Moreover, a great number of image capturing lenses LN made up of two lens units LU can also be produced at a reduced cost.

The aforementioned lens unit LU (image capturing lens LN) is preferably applied to the digital equipment provided with an image input function (e.g., portable terminal). Thus, the lens unit LU can constitute the aforementioned image capturing device ID whereby the lens unit LU is combined with the image capturing element SR and others, whereby the image of a subject is optically captured and is outputted as an electric signal. The image capturing device ID is an optical device as one of the major constituents of the camera used to photograph both still and moving images of a subject.

Examples of the camera include a digital camera, video camera, monitoring camera, onboard camera, and visual telephone camera. Further examples are the cameras built in or mounted outside a personal computer, portable terminal (e.g., a compact portable information equipment terminal such as a cellular mobile telephone and mobile computer), peripheral device thereof (e.g., scanner and printer) and other digital devices. As can be seen from these examples, use of the image capturing device ID not only permits a camera to be constituted, but also allows a camera function to be added by the image capturing devices ID mounted on various types of devices. For example, use of the image capturing device ID provides a digital device provided with an image input function in the camera-mounted cellular mobile telephone and others.

Figure 19:
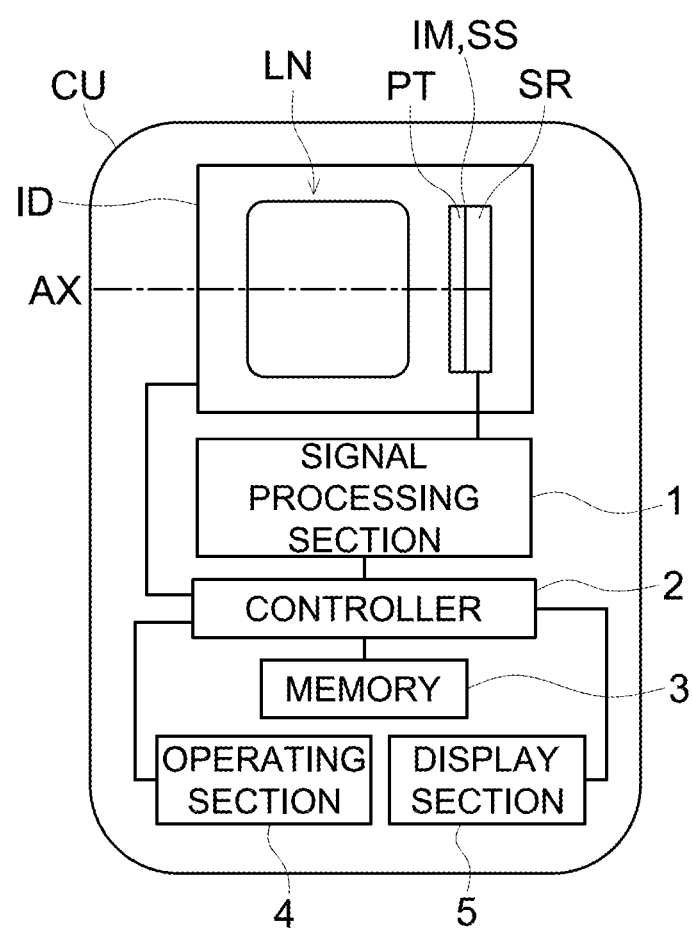
FIG. 19 is an explanatory diagram showing the structure of the portable terminal.

FIG. 19 is an explanatory diagram showing the structure of the portable terminal CU as an example of the digital device provided with an image input function. The portable terminal CU is provided with a signal processing section 1, control section 2, memory 3, operation section 4, and display section 5 in addition to the aforementioned image capturing device ID.

In the image capturing device ID, the optical image IM formed on the light receiving surface SS by the image capturing lens LN is converted into an electric signal by the image capturing element SR and is outputted. The signal outputted from the image capturing element SR is inputted into the signal processing section 1 and is subjected to predetermined processing such as digital image processing and image compression processing, as required. After that, this signal is stored in the memory 3 (e.g., semiconductor memory and storage section of the optical disk) as a digital signal. The aforementioned video signal is sent to other equipment through a cable or after having been converted into an infrared signal, depending on the case.

The control section 2 is made of a microcomputer and provides control of functions such as a photographing function and image reproducing function, control of the lens shifting mechanism for focusing, and control of various components. For example, the image capturing device ID is controlled by the control section 2 so as to perform photographing of at least one of the still and moving images.

The operation section 4 includes the operation members such as an operation button (e.g., release button) and operation dial (e.g., photographing mode dial). The information inputted by the operator is sent to the control section 2. The display section 5 includes a display such as a liquid crystal monitor, and displays an image by using the image signal converted by the image capturing element SR or the image information stored in the memory 3.

The optical image formed by the image capturing lens LN passes through the optical low-pass filter (parallel plane plate PT of FIG. 19) having a predetermined cutoff frequency characteristic determined by the pixel pitch of the image capturing element SR. In this case, the spatial frequency characteristic is regulated so as to minimize the so-called folding noise produced at the time of being converted to an electric signal. This procedure suppresses occurrence of a chromatic moiré pattern.

If the performance on the periphery of the resolution limit frequency is suppressed, however, there is no need for concern about the production of noise, even when the optical low-pass filter is not used. There is no need for employing an optical low-pass filter when a user wants to take a photograph or to enjoy watching by using the display system (e.g., liquid crystal screen of a cellar mobile phone) wherein noise is not very conspicuous.

When the image capturing device ID is used to constitute a portable terminal CU equipped with an image input function, the image capturing device ID is normally arranged inside the body thereof. When the camera function is used, a desired form in conformance to particular requirements can be utilized. For example, a unitized image capturing device ID can be mounted removably or rotatably on the main body of the portable terminal CU.

EXAMPLES

A specific configuration and others of the lens unit LU of the image capturing device ID in embodiments 1 through 7 will be described as Examples 1 through 7 with reference to construction data. The Examples 1 through 7 show the numerical values corresponding to those of the aforementioned embodiments 1 through 7. The optical schematic diagrams (FIGS. 1 through 7) indicate the lens configurations of the corresponding examples 1 through 7.

The construction data of each Example includes the surface number Si, radius r (mm), on-axis surface spacing d (mm), refractive index nd with respect to line d, and Abbe's number vd with respect to line d, in that order as viewed from the left column. The surface number Si denotes the i-th surface as viewed from the object. The surface having the surface number Si affixed with * (asterisk) is aspherical and is defined by the following formula (AS) using the local Cartesian coordinates wherein the vertex of the surface thereof is used as an origin. In the aspherical surface data of each Example, the coefficient of the items without any notation is 0 (zero). For all data, $E-n=\times 10^{-n}$.

$$z=(c \cdot h^2)/[1+\sqrt{[1-(1+K) \cdot c^2 \cdot h^2]}]+A \cdot h^4+B \cdot h^6+C \cdot h^8+D \cdot h^{10}+E \cdot h^{12} \tag{AS}$$

wherein;
h: Height ($h^2=x^2+y^2$) perpendicular to the z-axis (optical axis AX)
z: Sag in the direction of optical axis AX at height h (with reference to the vertex of the surface)
c: Curvature at the vertex of the surface (reciprocal of radius r)
K: Conical constant
A, B, C, D, E: aspherical coefficients of 4th order, 6th order, 8th order, 10th order, 12th order, FIGS. 10 through 16 show aberrations in the Examples 1 through 7. These diagrams are spherical aberration diagram (LONGITUDINAL SPHERICAL ABER.), astigmatism diagram (ASTIGMATIC FIELD CURVES), and distortion diagram (DISTORTION) in that order as viewed from the left. In the spherical aberration diagrams, the spherical aberration for the line d indicated by a solid line (wavelength: 587.56 nm), the spherical aberration for the line C indicated by a broken line (wavelength: 656.28 nm), and the spherical aberration for the line g indicated by a one-dot chain line (wavelength: 435.84 nm) each are represented in terms of the deviations from the paraxial image surface (unit: mm, horizontal scale: −0.050 through 0.050 mm) in the direction of optical axis. The vertical axis represents the value (i.e., relative height of pupils) obtained by normalizing the incident height to the pupils in terms of the maximum height thereof.

In the astigmatism diagram, the broken line T shows the tangential image surface with reference to the line d, and the solid line S indicates the sagittal image surface with reference to line d in terms of deviations from the paraxial image surface (unit: mm, horizontal scale: −0.050 through 0.050 mm) in the direction of optical axis. The vertical axis represents the image height (IMG HT, unit: mm). In the distortion diagram, the horizontal axis indicates the distortion with reference to line d (unit: %, horizontal scale: −2.0 through 2.0%) in the direction of optical axis. The vertical axis represents the image height (IMG HT, unit: mm). The image height IMG HT corresponds to the maximum image height Y (half the width across the corner of the light receiving surface SS of the imaging element SR) in the image forming surface.

Example 1

See FIG. 10

Unit: mm
<Surface Data>

| Si | r | d | nd | vd |
|---|---|---|---|---|
| 1* | 0.7745 | 0.295 | 1.48000 | 61.00 |
| 2 (stop) | ∞ | 0.500 | 1.54348 | 63.60 |
| 3 | ∞ | 0.085 | 1.58700 | 31.00 |
| 4* | 2.8911 | 0.39064 | | |
| 5* | −1.7226 | 0.085 | 1.58700 | 31.00 |
| 6 | ∞ | 0.500 | 1.59759 | 59.11 |
| 7 | ∞ | 0.532 | 1.58700 | 31.00 |
| 8* | 15.1183 | 0.651 | | |

<Aspherical Data>
Surface S1
K=−1.76E−01,
A=−6.72E−03, B=2.76E−01, C=−9.47E−01, D=1.81E+00
Surface S4
K=−1.01E+02
A=6.27E−01, B=−8.58E−01, C=9.68E−01, D=1.26E+01
Surface S5
K=7.53E+00
A=−4.09E−01, B=−1.22E+00, C=6.53E+00, D=−2.22E+01
Surface S8
K=−2.70E+03
A=−1.36E−01, B=−3.12E−02, C=2.08E−02, D=−1.29E−02

Example 2

See FIG. 11

Unit: mm
<Surface Data>

| Si | r | d | nd | vd |
|---|---|---|---|---|
| 1* | 0.7737 | 0.296 | 1.47512 | 61.00 |
| 2 (stop) | ∞ | 0.500 | 1.54345 | 63.60 |
| 3 | ∞ | 0.085 | 1.58176 | 31.00 |
| 4* | 2.8794 | 0.391 | | |
| 5* | −1.7165 | 0.085 | 1.58176 | 31.00 |
| 6 | ∞ | 0.500 | 1.59756 | 59.11 |
| 7 | ∞ | 0.534 | 1.58176 | 31.00 |
| 8* | 15.6569 | 0.697 | | |

<Aspherical Data>
Surface S1
K=−1.51E−01,
A=−1.60E−02, B=2.80E−01, C=−9.50E−01, D=1.80E+00, E=0.00E+00
Surface S4
K=−1.01E+02,
A=6.30E−01, B=−8.60E−01, C=9.70E−01, D=1.30E+01, E=0.00E+00
Surface S5
K=7.51E+00,
A=−4.10E−01, B=−1.20E+00, C=6.50E+00, D=−2.20E+01, E=0.00E+00
Surface S8
K=−2.11E+03,
A=−1.40E−01, B=−2.50E−02, C=1.80E−02, D=−1.30E−02, E=−7.00E−10

Example 3

See FIG. 12

Unit: mm
<Surface Data>

| Si | r | d | nd | vd |
|---|---|---|---|---|
| 1* | 0.7737 | 0.286 | 1.47512 | 61.00 |
| 2 | ∞ | 0.010 | 1.47800 | 61.00 |
| 3 (stop) | ∞ | 0.500 | 1.54345 | 63.60 |
| 4 | ∞ | 0.010 | 1.47800 | 61.00 |
| 5 | ∞ | 0.075 | 1.58176 | 31.00 |
| 6* | 2.8794 | 0.391 | | |
| 7* | −1.7165 | 0.065 | 1.58176 | 31.00 |
| 8 | ∞ | 0.010 | 1.47800 | 61.00 |
| 9 | ∞ | 0.500 | 1.59756 | 59.11 |
| 10 | ∞ | 0.010 | 1.47800 | 61.00 |
| 11 | ∞ | 0.534 | 1.58176 | 31.00 |
| 12* | 15.6569 | 0.697 | | |

<Aspherical Data>
Surface S1
K=−1.51E−01,
A=−1.60E−02, B=2.80E−01, C=−9.50E−01, D=1.80E+00, E=0.00E+00
Surface S6
K=−1.01E+02,
A=6.30E−01, B=−8.60E−01, C=9.70E−01, D=1.30E+01, E=0.00E+00
Surface S7
K=7.51E+00,
A=−4.10E−01, B=−1.20E+00, C=6.50E+00, D=−2.20E+01, E=0.00E+00
Surface S12
K=−2.11E+03,
A=−1.40E−01, B=−2.50E−02, C=1.80E−02, D=−1.30E−02, E=−7.00E−10

Example 4

See FIG. 13

Unit: mm
<Surface Data>

| Si | r | d | nd | vd |
|---|---|---|---|---|
| 1* | 0.7752 | 0.294 | 1.48488 | 61.00 |
| 2 (stop) | ∞ | 0.500 | 1.54348 | 63.60 |
| 3 | ∞ | 0.085 | 1.59223 | 31.00 |
| 4* | 2.9030 | 0.390 | | |
| 5* | −1.7290 | 0.085 | 1.59223 | 31.00 |
| 6 | ∞ | 0.500 | 1.59759 | 59.11 |
| 7 | ∞ | 0.530 | 1.59223 | 31.00 |
| 8* | 14.3507 | 0.625 | | |

<Aspherical Data>
Surface S1
K=−2.03E−01,
A=2.04E−03, B=2.80E−01, C=−9.50E−01, D=1.80E+00, E=0.00E+00
Surface S4
K=−1.01E+02,
A=6.20E−01, B=−8.60E−01, C=9.70E−01, D=1.30E+01, E=0.00E+00
Surface S5
K=7.56E+00,
A=−4.10E−01, B=−1.20E+00, C=6.50E+00, D=−2.20E+01, E=0.00E+00
Surface S8
K=−3.51E+03,
A=−1.30E−01, B=−3.80E−02, C=2.30E−02, D=−1.30E−02, E=4.90E−08

Example 5

See FIG. 14

Unit: mm
<Surface Data>

| Si | r | d | nd | vd |
|---|---|---|---|---|
| 1* | 0.7745 | 0.296 | 1.48000 | 61.00 |
| 2 (stop) | ∞ | 0.500 | 1.54345 | 63.60 |
| 3 | ∞ | 0.085 | 1.58700 | 31.00 |
| 4* | 2.8911 | 0.391 | | |
| 5* | −1.7226 | 1.119 | 1.58000 | 31.00 |
| 6* | 15.1183 | 0.638 | | |

<Aspherical Data>
Surface S1
K=−1.76E−01,
A=−6.72E−03, B=2.76E−01, C=−9.47E−01, D=1.81E+00
Surface S4
K=−1.01E+02,
A=6.27E−01, B=−8.58E−01, C=9.68E−01, D=1.26E+01
Surface S5
K=7.53E+00,
A=−4.09E−01, B=−1.22E+00, C=6.53E+00, D=−2.22E+01
Surface S6
K=−2.70E+03,
A=−1.36E−01, B=−3.12E−02, C=2.08E−02, D=−1.29E−02

Example 6

See FIG. 15

Unit: mm
<Surface Data>

| Si | r | d | nd | vd |
|---|---|---|---|---|
| 1* | 0.7737 | 0.296 | 1.47512 | 61.00 |
| 2 (stop) | ∞ | 0.500 | 1.54345 | 63.60 |
| 3 | ∞ | 0.085 | 1.58176 | 31.00 |
| 4* | 2.8794 | 0.391 | | |
| 5* | −1.7250 | 1.119 | 1.57479 | 31.00 |
| 6* | 15.1395 | 0.677 | | |

<Aspherical Data>
Surface S1
K=−1.51E−01,
A=−1.60E−02, B=2.80E−01, C=−9.50E−01, D=1.80E+00, E=0.00E+00
Surface S4
K=−1.01E+02,
A=6.30E−01, B=−8.60E−01, C=9.70E−01, D=1.30E+01, E=0.00E+00
Surface S5
K=7.534520129,
A=−0.407112995, B=−1.212973167, C=6.462307328, D=−21.88046663, E=0.00
Surface S6
K=−2700.612097,
A=−0.135541512, B=−0.030975221, C=0.020625018, D=−0.012713866, E=0.00

Example 7

See FIG. 16

Unit: mm
<Surface Data>

| Si | r | d | nd | vd |
|---|---|---|---|---|
| 1* | 0.7752 | 0.294 | 1.48488 | 61.00 |
| 2 (stop) | ∞ | 0.500 | 1.54345 | 63.60 |
| 3 | ∞ | 0.085 | 1.59223 | 31.00 |
| 4* | 2.9030 | 0.390 | | |
| 5* | −1.7202 | 1.116 | 1.58521 | 31.00 |
| 6* | 15.0972 | 0.619 | | |

<Aspherical Data>
Surface S1
K=−2.03E−01,
A=2.40E−03, B=2.80E−01, C=−9.50E−01, D=1.80E+00, E=0.00E+00
Surface S4
K=−1.01E+02,
A=6.20E−01, B=−8.60E−01, C=9.70E−01, D=1.30E+01, E=0.00E+00
Surface S5
K=7.53E+00,
A=−4.11E−01, B=−1.23E+00, C=6.59E+00, D=−2.24E+01, E=0.00E+00
Surface S6
K=−2.70E+03,
A=−1.37E−01, B=−3.14E−02, C=2.10E−02, D=−1.30E−02, E=0.00E+00

Table 1 shows the values corresponding to the conditional expressions and various forms of data in Examples 1 through 7. Various forms of data include the focal distance (f, mm), image height (Y, mm), back focus (BF, mm), F-number (Fno), half angle of view (ω, °), and overall optical length (TL, mm). The image height is the value free of distortion, and the angle of view is the value incorporating the distortion. The back focus is shown in terms of air converted length. (This description also applies to the back focus included in the overall optical length.)

TABLE 1

|  | Example 1 | Example 2 | Example 3 | Example 4 | Example 5 | Example 6 | Example 7 |
|---|---|---|---|---|---|---|---|
| dn/dt (Conditional expression (1)) | −1.10E−04 | −1.10E−04 | −1.10E−04 | −1.10E−04 | −1.10E−04 | −1.10E−04 | −1.10E−04 |
| a (Conditional expression (2)) | 7.00E−05 | 7.00E−05 | 7.00E−05 | 7.00E−05 | 7.00E−05 | 7.00E−05 | 7.00E−05 |
| b | 7.20E−06 | 7.20E−06 | 7.20E−06 | 7.20E−06 | 7.20E−06 | 7.20E−06 | 7.20E−06 |
| fs1 | 2.490 | 2.514 | 2.514 | 2.467 | 2.490 | 2.514 | 2.467 |
| Conditional expression (3) | 0.103 | 0.103 | 0.103 | 0.103 | 0.103 | 0.103 | 0.103 |
| Conditional expression (4) | 0.82 | 0.81 | 0.81 | 0.81 | 0.82 | 0.81 | 0.81 |
| Conditional expression (5) Surface S4 | 1.05 | 1.05 | 1.05 | 1.05 |  |  |  |
| Surface S5 | 2.95 | 2.95 | 2.95 | 2.95 |  |  |  |
| Temperature (° C.) | 20.00 | 50.00 | 50.00 | −10.00 | 20.00 | 50.000 | −10.000 |
| f | 3.06 | 3.11 | 3.11 | 3.00 | 3.03 | 3.09 | 3.00 |
| Y | 1.75 | 1.75 | 1.75 | 1.75 | 1.75 | 1.75 | 1.75 |
| BF | 0.67 | 0.70 | 0.67 | 0.63 | 0.64 | 0.68 | 0.62 |
| Fno | 2.80 | 2.80 | 2.80 | 2.80 | 2.80 | 2.80 | 2.80 |
| ω | 29.77 | 29.32 | 29.32 | 30.24 | 30.03 | 29.52 | 30.24 |
| TL | 3.05 | 3.09 | 3.09 | 3.01 | 3.03 | 3.07 | 3.00 |

The aforementioned construction data of Examples 1 and 3 shows that the paraxial radius of the aspherical surfaces of the 1st lens portion L1, 2nd lens portion L2, and 3rd lens portion L3 is smaller than the design value if the temperature has raised plus 30° C. from the design value (20° C.). In the meantime, in the 4th lens portion L4, the aspherical surface shape is complicated and the extreme point (inflection point) appears on the surface shape at the position close to where the light flux of the mid-band image height passed by. Thus, the paraxial radius is not reduced. However, the paraxial radius of the aspherical surfaces of the 1st lens portion L1, 2nd lens portion L2, and 3rd lens portion L3 is reduced with the temperature rise. This suggests that, in the structure of Example 3, defocusing due to temperature rise can be suppressed, and deterioration in the performance of the entire lens system can be reduced.

FIGS. 17a through 17d schematically show the surface shape of the lens subsequent to temperature change of plus 20° C. from the design value (20° C.) in the structure wherein the 1st lens portion L1 through 4th lens portion L4 of Example 1 are provided with C1 through C4, respectively. In the drawings, a broken line is used to indicate the surface shape (interface with air) subsequent to the change of the surface shape due to temperature change. Since the 1st lens portion L1 through 4th lens portion L4 are rotationally symmetric around the optical axis AX, only that half is illustrated.

It can be seen that the surface shapes of the 1st lens portion L1 through 4th lens portion L4 have changed with temperature change. Especially in the 2nd lens portion L2 of FIG. 17b having a negative power, the value of the conditional expression (5) for the surface S4 is as small as 1.05 as shown in Table 1. This suggests that the edge C2 does not have much influence on the surface shape of the surface S4.

Figure 17A:
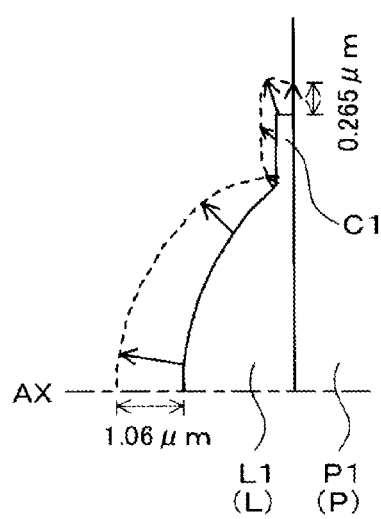
FIGS. 17a through 17d are explanatory diagrams schematically showing the change in the lens surface shape subsequent to temperature change in the structure wherein each lens portion of the embodiment 1 is provided with a lens edge.
Figure 17B:
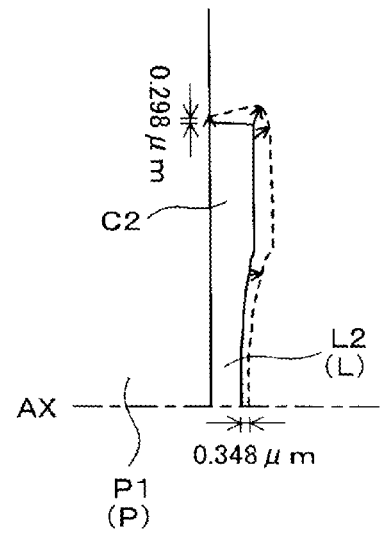
Figure 17C:
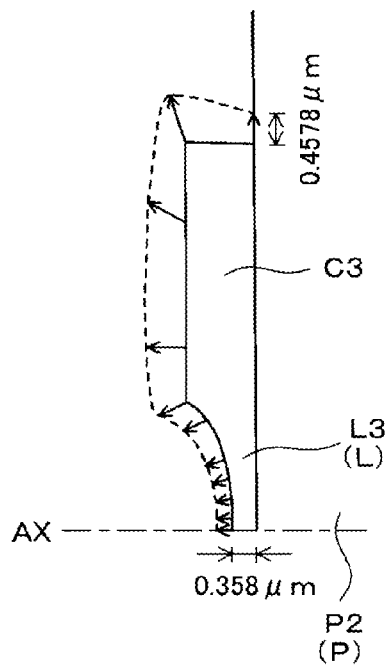
Figure 17D:
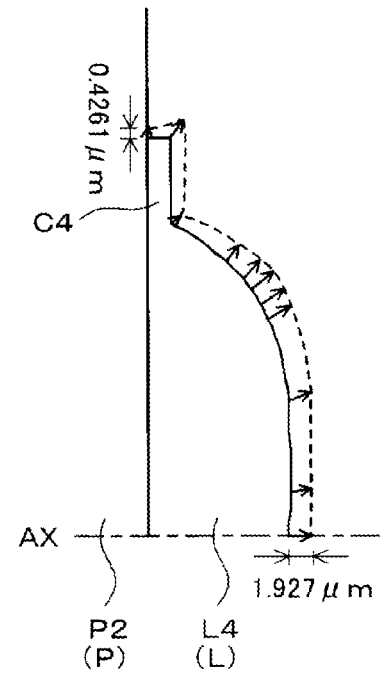

In the meantime, in the 3rd lens portion L3 of FIG. 17c having a negative power, the value of the conditional expression (5) for the surface S5 is 2.95 and is greater than that of the 2nd lens portion L2, as shown in Table 1. This shows that the edge C3 has much influence on the surface shape of the surface S5. However, if the value is kept within the tolerance of surface shape, impact on the image surface is small. In the 4th lens portion L4 of FIG. 17d having a negative power, the aspherical surface has an extreme value (inflection point), but the paraxial focal distance is long. Thus, the surface shape is gently sloping. This does not have much influence on defocusing.

The above description has referred to the examples wherein the lens units (1st lens unit LU1 and second lens unit LU2) of the present invention each having a lens holding plate P and lens portion L are applied to the image capturing optical system (image capturing lens). The lens unit of the present invention is also applied to other optical systems such as a projection type optical system and illumination optical system.

INDUSTRIAL FIELD OF APPLICATION

The lens unit of the present invention solves the defocusing problem caused by changes in the refractive index and lens surface shape of a resin lens, and is applicable to the wafer lens made of a composite cemented lens and an optical system equipped therewith.

The invention claimed is:

1. A lens unit including: a lens holding plate; and a lens portion formed on at least one of a light-emitting surface and a light-receiving surface of the lens holding plate, and made of a material different from that of the lens holding plate, wherein a linear expansion coefficient of the lens portion is greater than that of the lens holding plate and when a change in a refractive index of the lens portion resulting from temperature change is "dn/dt" and the linear expansion coefficient of the lens portion is "a", the following conditional expressions (1) and (2) are satisfied:

$$-480 \times 10^{-6} \leq dn/dt \leq -18 \times 10^{-6} \quad (1)$$

$$90 \times 10^{-7} \leq a \leq 1990 \times 10^{-7} \quad (2).$$

2. The lens unit of claim 1, wherein when the linear expansion coefficient of the lens holding plate is "b", the following conditional expression (3) is satisfied:

$$b/a < 0.34 \quad (3).$$

3. The lens unit of claim 2, wherein a focal distance of the lens portion is "f1" and a focal distance of the lens unit is "f", the following conditional expression (4) is satisfied:

$$0.6 \leq |f1/f| \leq 1.2 \quad (4).$$

4. The lens unit of claim 1, wherein the lens portion has a positive or negative power and a surface of the lens portion has no inflection point in a range from a vertex of the surface to an effective diameter of the lens portion.

5. The lens unit of claim 4, wherein the lens portion has a negative power, and the lens portion having the negative power includes an edge formed outside the effective diameter, as viewed from an optical axis of the lens portion, and when a length from an outermost rim of the effective diameter of the lens portion to an outermost rim of the edge is "Le", and an effective radius of the lens portion is "r", the following conditional expression (5) is satisfied:

$$Le/r \leq 3.5 \tag{5}$$

6. The lens unit of claim 1, wherein the lens holding plate and the lens portion are indirectly bonded through an optically functioning thin film or adhesive.

7. The lens unit of claim 1, wherein the lens portion is made of resin and the lens holding plate is made of glass.

8. The lens unit of claim 1, wherein a surface of the lens portion that contacts with air is aspherical.

9. The lens unit of claim 1, wherein the lens portion is made of a cured resin.

10. An image capturing lens comprising the lens unit of claim 1.

11. An image capturing device comprising the image capturing lens of claim 10 and an image pickup device for receiving a light obtained through the image capturing lens, and outputting an electric signal corresponding to an amount of light received.

12. A portable terminal provided with the image capturing device of claim 11.

13. A lens unit including: a lens holding plate; and a lens portion formed on at least one of a light-emitting surface and a light-receiving surface of the lens holding plate, and made of a material different from that of the lens holding plate, wherein a linear expansion coefficient of the lens portion is greater than that of the lens holding plate and when a change in a refractive index of the lens portion resulting from temperature change is "dn/dt" and the linear expansion coefficient of the lens portion is "a", the following conditional expressions (6) and (7) are satisfied:

$$-270 \times 10^{-6} \leq dn/dt \leq -18 \times 10^{-6} \tag{6}$$

$$90 \times 10^{-7} \leq a \leq 1100 \times 10^{-7} \tag{7},$$

wherein the lens portion is made of resin and the lens holding plate is made of glass, and wherein inorganic particles each having a maximum length of 30 nanometers or less are dispersed in the lens portion.

14. A method of manufacturing a plurality of lens units including: a lens holding plate; and a lens portion formed on at least one of a light-emitting surface and a light-receiving surface of the lens holding plate, and made of a material different from that of the lens holding plate, wherein a linear expansion coefficient of the lens portion is greater than that of the lens holding plate and when a change in a refractive index of the lens portion resulting from temperature change is "dn/dt" and the linear expansion coefficient of the lens portion is "a", the following conditional expressions (1) and (2) are satisfied:

$$-480 \times 10^{-6} \leq dn/dt \leq -18 \times 10^{-6} \tag{1}$$

$$90 \times 10^{-7} \leq a \leq 1990 \times 10^{-7} \tag{2},$$

the method comprising: a process of forming a plurality of the lens portions simultaneously on the lens holding plate, a process of sealing a plurality of the lens holding plates with one another through a grid-like spacer member, and a process of cutting off the integrally formed lens holding plates and spacer member along the grid of the spacer member.

* * * * *